(12) United States Patent
Suzuki et al.

(10) Patent No.: US 10,859,234 B2
(45) Date of Patent: Dec. 8, 2020

(54) LIGHTING UNIT

(71) Applicant: YAZAKI CORPORATION, Tokyo (JP)

(72) Inventors: Yasuo Suzuki, Shizuoka (JP); Shinji Mochizuki, Shizuoka (JP); Ryohei Ochiai, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 107 days.

(21) Appl. No.: 15/869,130

(22) Filed: Jan. 12, 2018

(65) Prior Publication Data

US 2018/0216796 A1 Aug. 2, 2018

(30) Foreign Application Priority Data

Jan. 27, 2017 (JP) ................... 2017-012883

(51) Int. Cl.
| | |
|---|---|
| *F21V 3/00* | (2015.01) |
| *B60Q 3/64* | (2017.01) |
| *B60Q 3/51* | (2017.01) |
| *B60Q 3/60* | (2017.01) |
| *F21V 17/16* | (2006.01) |
| *B60Q 3/54* | (2017.01) |

(52) U.S. Cl.
CPC .................. *F21V 3/00* (2013.01); *B60Q 3/51* (2017.02); *B60Q 3/60* (2017.02); *B60Q 3/64* (2017.02); *F21V 17/16* (2013.01); *B60Q 3/54* (2017.02)

(58) Field of Classification Search
CPC ... B60Q 3/51; B60Q 3/54; B60Q 3/60; B60Q 3/64; F21V 17/16; F21V 3/00
See application file for complete search history.

(56) References Cited

U.S. PATENT DOCUMENTS

| | | | | |
|---|---|---|---|---|
| 4,733,335 A | * | 3/1988 | Serizawa | ................ F21V 29/74 362/503 |
| 6,550,953 B1 | | 4/2003 | Ichikawa et al. | |

(Continued)

FOREIGN PATENT DOCUMENTS

| | | |
|---|---|---|
| JP | 2001-243829 A | 9/2001 |
| JP | 2014-157688 A | 8/2014 |

(Continued)

OTHER PUBLICATIONS

The office action dated Mar. 26, 2019, in a counterpart Japanese patent application.

*Primary Examiner* — Tsion Tumebo
(74) *Attorney, Agent, or Firm* — Metrolex IP Law Group, PLLC

(57) ABSTRACT

A lighting unit includes a housing, a first cover, and a second cover. The housing is configured to house a light source and a circuit body constituting a circuit between the light source and an outside of the housing. The first cover is mountable to the housing and configured to emit light from the light source to the outside of the housing. The second cover is mountable to the housing and includes a cover-side attachment portion attachable to an attachment hole of a lighting attachment member. The second cover is configured to emit the light from the light source to the outside of the housing through the attachment hole. The first cover and the second cover are selectively mountable to the housing.

9 Claims, 25 Drawing Sheets

(56) References Cited

U.S. PATENT DOCUMENTS

| | | | |
|---|---|---|---|
| 7,914,039 B2 * | 3/2011 | Mazzocchi | B60R 21/205 280/728.2 |
| 8,277,093 B2 * | 10/2012 | Mochizuki | F21V 21/002 362/218 |
| 8,734,182 B2 * | 5/2014 | Peng | H05K 5/0278 439/607.01 |
| 9,347,652 B2 | 5/2016 | Hino et al. | |
| 9,551,821 B2 | 1/2017 | Suzuki | |
| 10,017,108 B2 | 7/2018 | Suzuki | |
| 2005/0254250 A1 * | 11/2005 | Nagai | B60Q 3/51 362/490 |
| 2006/0214399 A1 * | 9/2006 | Okamoto | B60R 21/205 280/728.3 |
| 2006/0279959 A1 * | 12/2006 | Yabashi | B60Q 3/57 362/490 |
| 2008/0198607 A1 * | 8/2008 | Goto | F21V 5/04 362/362 |
| 2009/0154183 A1 * | 6/2009 | Nagai | B60Q 3/74 362/509 |
| 2010/0080014 A1 | 4/2010 | Ichikawa | |
| 2012/0014124 A1 * | 1/2012 | Anderson | G02B 6/0036 362/509 |
| 2015/0146433 A1 | 5/2015 | Suzuki | |
| 2015/0176814 A1 | 6/2015 | Hino et al. | |
| 2015/0345753 A1 | 12/2015 | Mochizuki | |
| 2017/0096096 A1 | 4/2017 | Suzuki | |
| 2018/0290588 A1 | 10/2018 | Suzuki | |

FOREIGN PATENT DOCUMENTS

| | | |
|---|---|---|
| JP | 2015-122164 A | 7/2015 |
| JP | 2016-54196 A | 4/2016 |
| WO | 2013/168253 A1 | 11/2013 |

* cited by examiner

LIGHTING UNIT

CROSS REFERENCE TO RELATED APPLICATION

This application is based upon and claims the benefit of priority from the prior Japanese Patent Application No. 2017-012883, filed on Jan. 27, 2017, the entire contents of which are incorporated herein by reference.

BACKGROUND

1. Technical Field

The disclosure relates to a lighting unit used in a room of a vehicle and the like.

2. Related Art

In a vehicle, lighting units are installed in various places (door courtesy lighting, feet lighting, map lighting, charging port lighting, and the like). Depending on installation locations, lighting units having different light emitting modes are used, and those having different attachment structures are applied.

For example, a lighting unit such that a cover side that serves as a light emitting surface constitutes a design surface at a position conspicuous from the outside is configured to be attached to a lighting attachment member with the entire cover exposed. In addition, JP 2001-243829 A describes a structure in which a lighting unit with a cover arranged in a position inconspicuous from the outside is attached to an attachment hole opened in a panel that is a lighting attachment member.

Conventionally, lighting units adapted to desired light emitting modes and attachment structures are individually designed and manufactured.

SUMMARY

In view of such circumstances, there is a demand for making components of multiple patterns of lighting units having different light emitting modes and attachment structures common among the lighting units.

It is an object of the disclosure to provide lighting units having different light emitting modes and attachment structures to lighting attachment members, the components of which can be made common among the lighting units as much as possible.

A lighting unit in accordance with some embodiments includes a housing, a first cover, and a second cover. The housing is configured to house a light source and a circuit body constituting a circuit between the light source and an outside of the housing. The first cover is mountable to the housing and configured to emit light from the light source to the outside of the housing. The second cover is mountable to the housing and includes a cover-side attachment portion attachable to an attachment hole of a lighting attachment member. The second cover is configured to emit the light from the light source to the outside of the housing through the attachment hole. The first cover and the second cover are selectively mountable to the housing.

According to the above configuration, the lighting unit becomes different in the light emitting mode between when the first cover is mounted and when the second cover is mounted. In addition, when the second cover is mounted, the lighting unit can be attached to an attachment hole of a lighting attachment member by using the second cover. Thus, in order to manufacture lighting units having different light emitting modes and attachment structures to lighting attachment members, it is sufficient to reassemble the cover. Therefore, components other than the covers can be made common among the lighting units.

DETAILED DESCRIPTION

Figure 1:
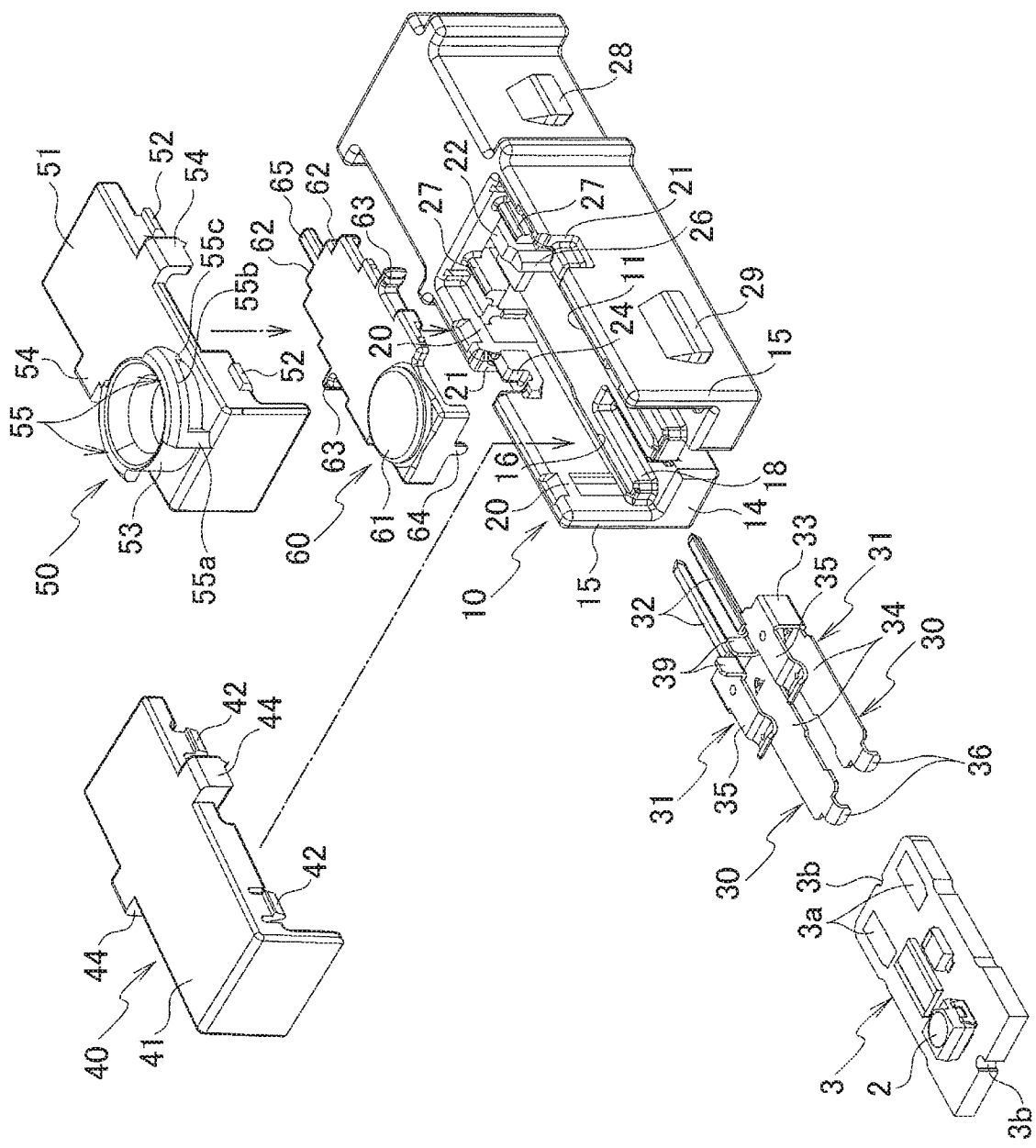
FIG. 1 is an exploded perspective view of a lighting unit according to one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for an embodiment of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Hereinafter, embodiments of the present invention will be described with reference to the drawings.

Overall Schematic Composition

Figure 2A:
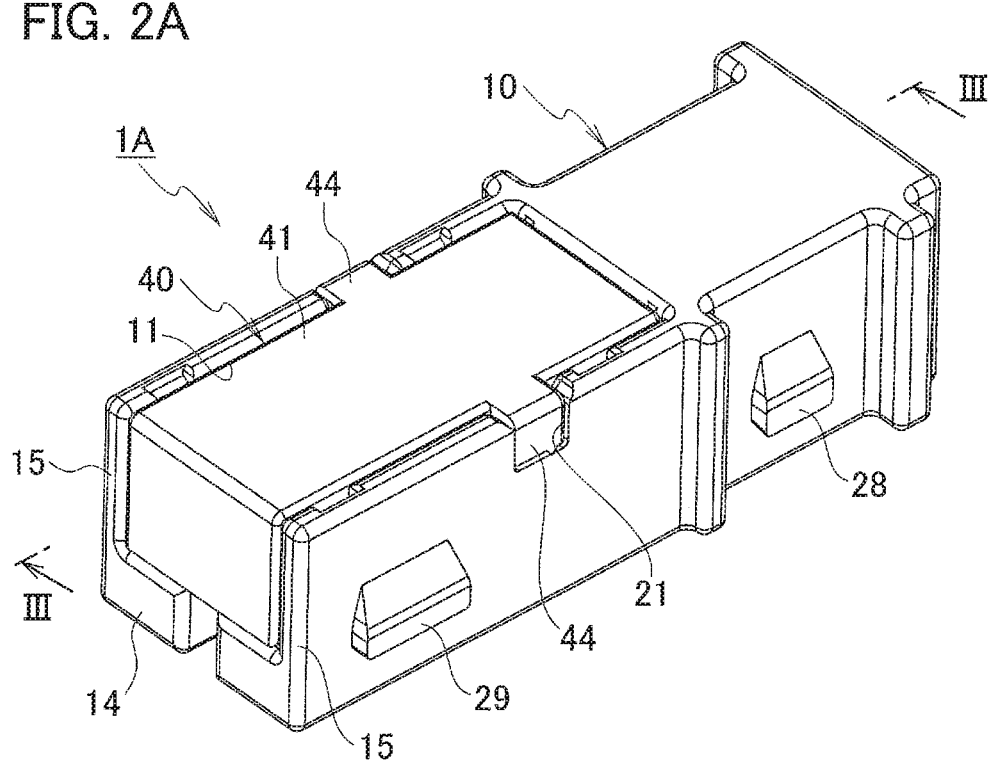
FIG. 2A is a perspective view of a lighting unit with a cover of a first aspect mounted thereon according to the embodiment of the present invention.
Figure 2B:
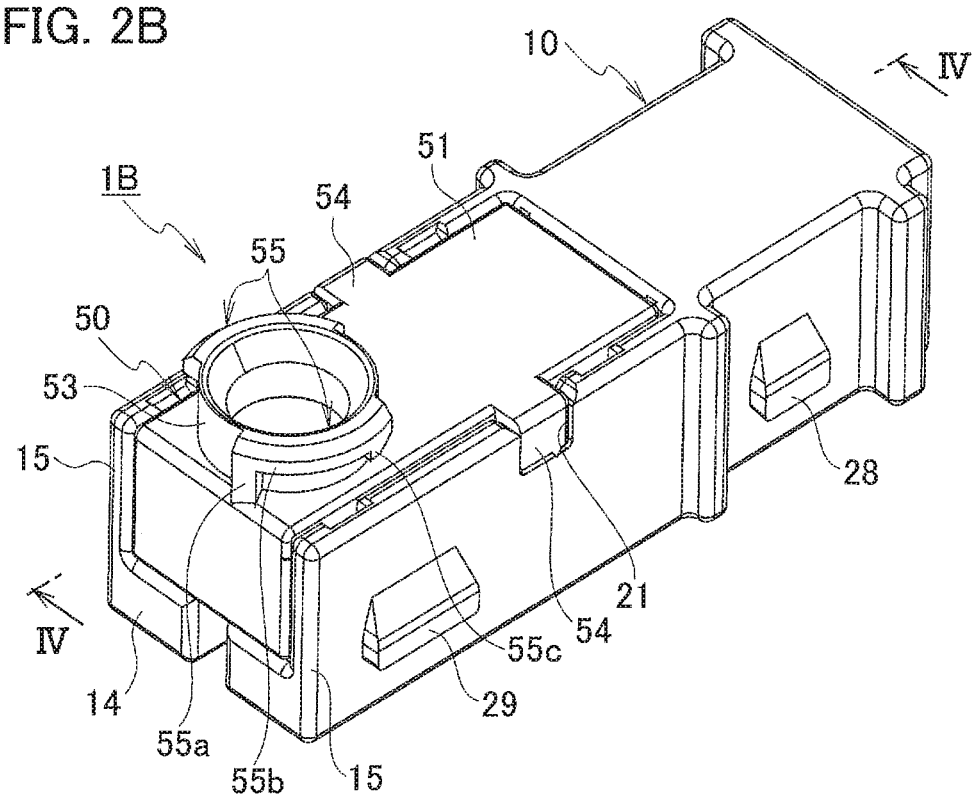
FIG. 2B is a perspective view of the lighting unit with a cover of a second aspect mounted thereon according to the embodiment of the present invention.
Figure 3:
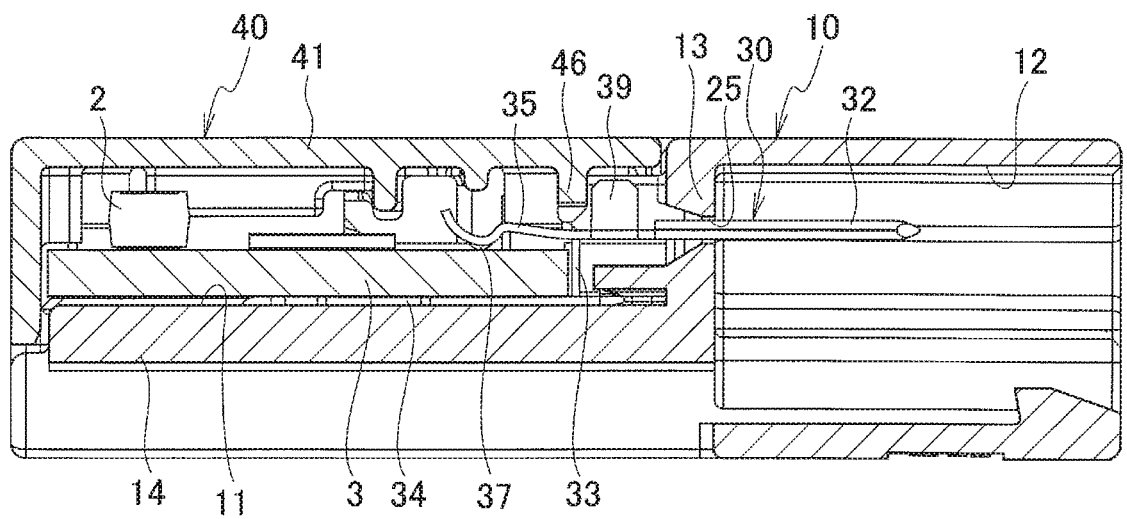
FIG. 3 is a cross-sectional view taken along line of FIG. 2A.
Figure 4:
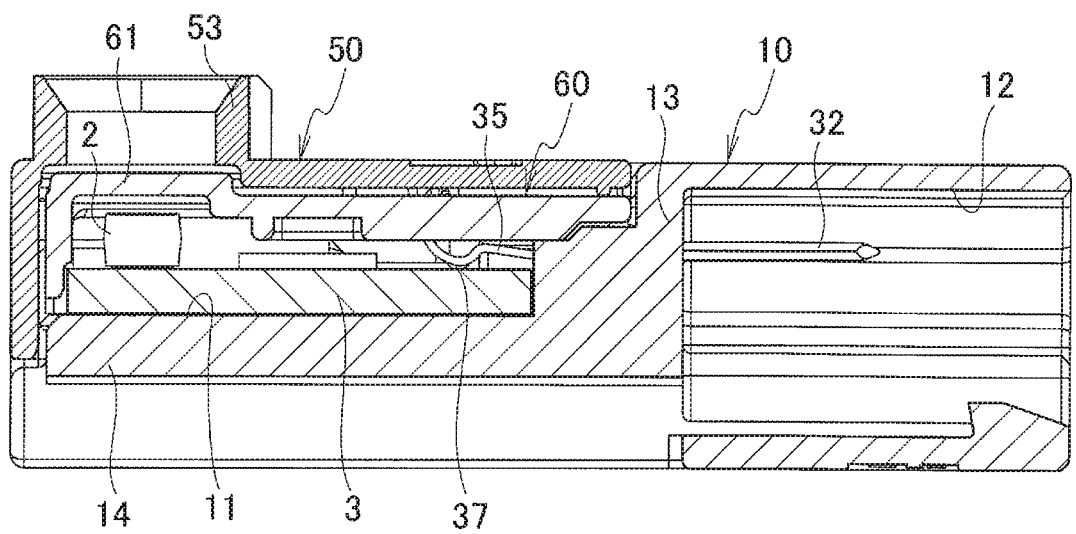
FIG. 4 is a cross-sectional view taken along line IV-IV of FIG. 2B.
Figure 5:
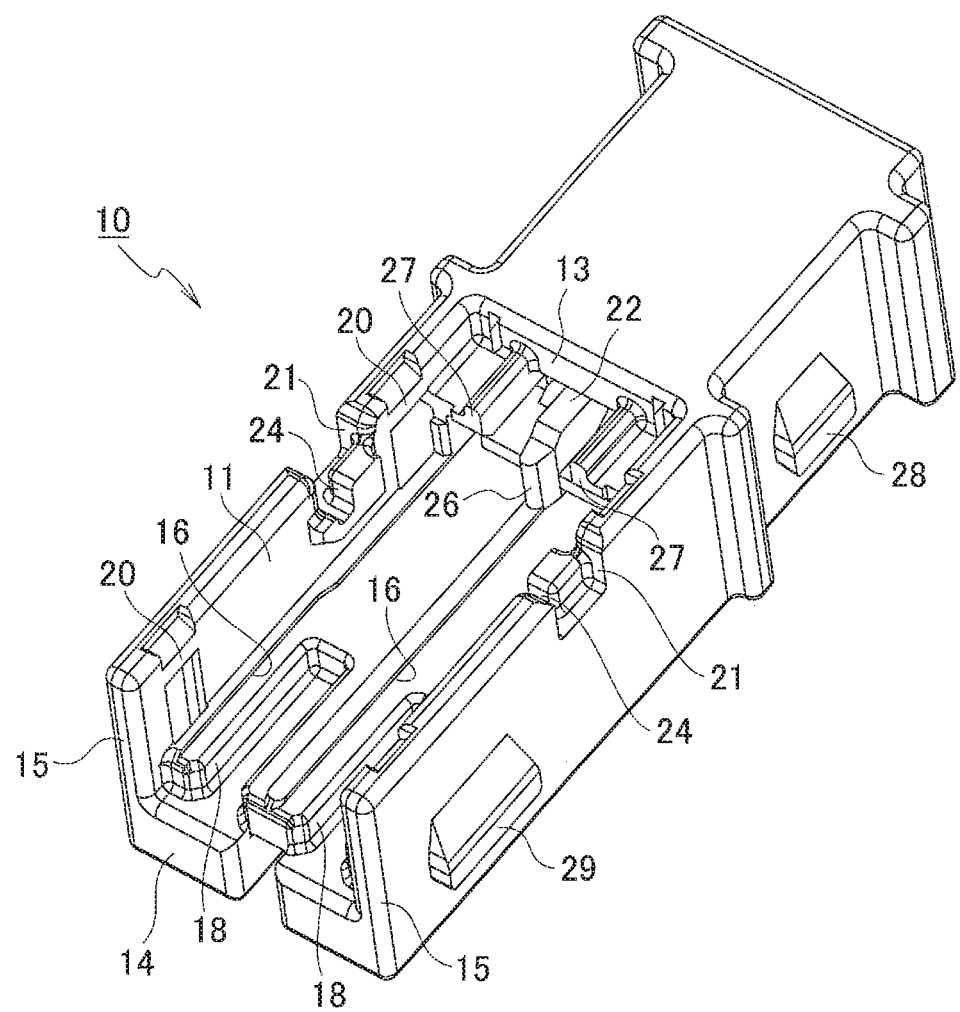
FIG. 5 is a perspective view of a housing according to the embodiment of the present invention.
Figure 6:
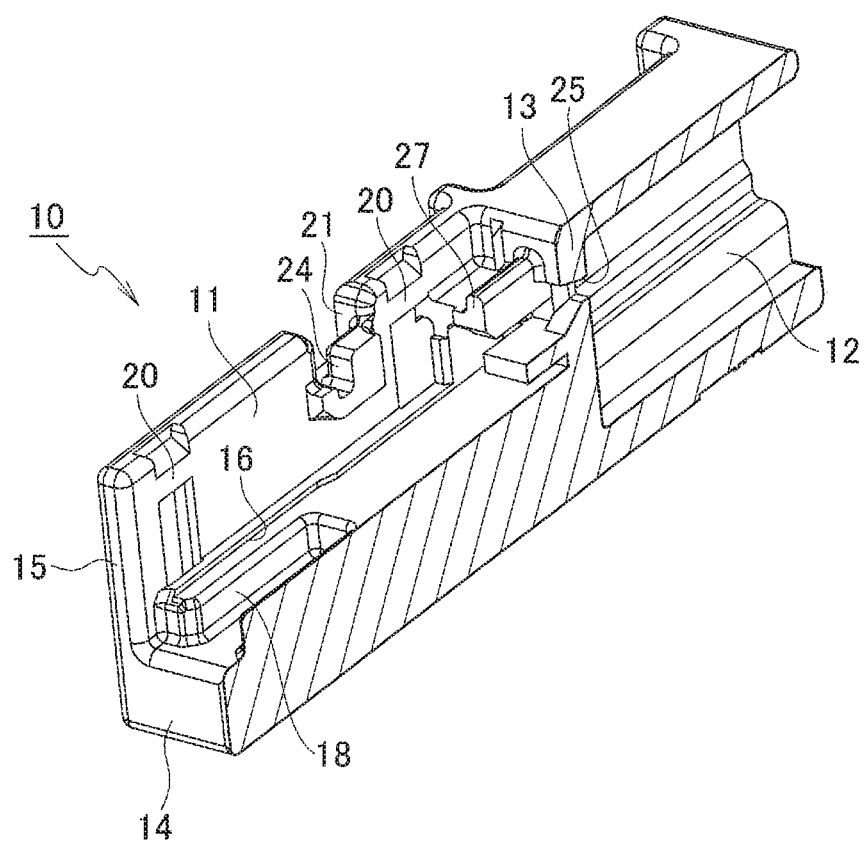
FIG. 6 is a partially cutaway perspective view of the housing according to the embodiment of the present invention.
Figure 7:
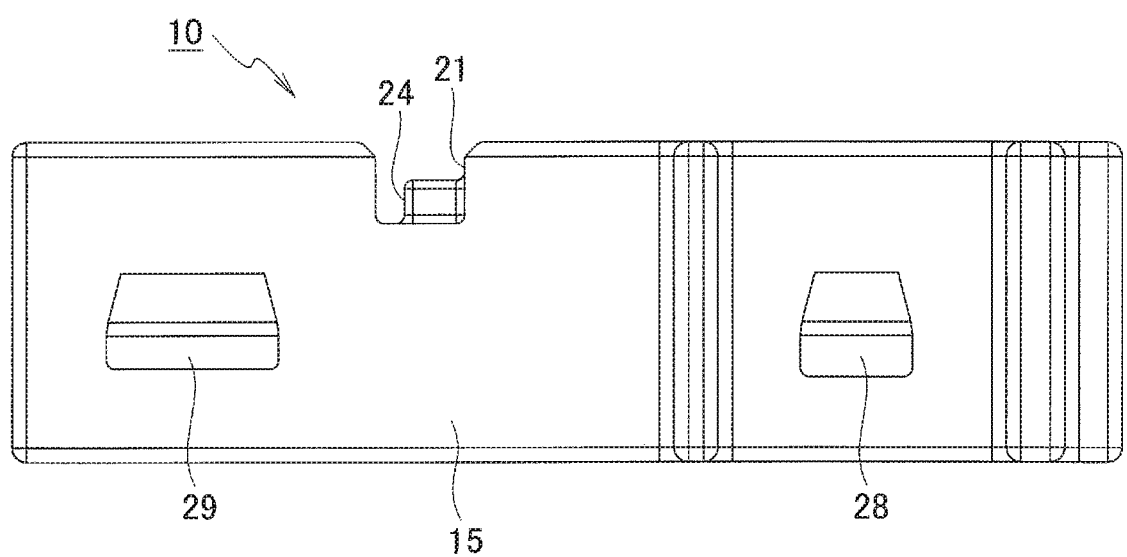
FIG. 7 is a side view of the housing according to the embodiment of the present invention.
Figure 8:
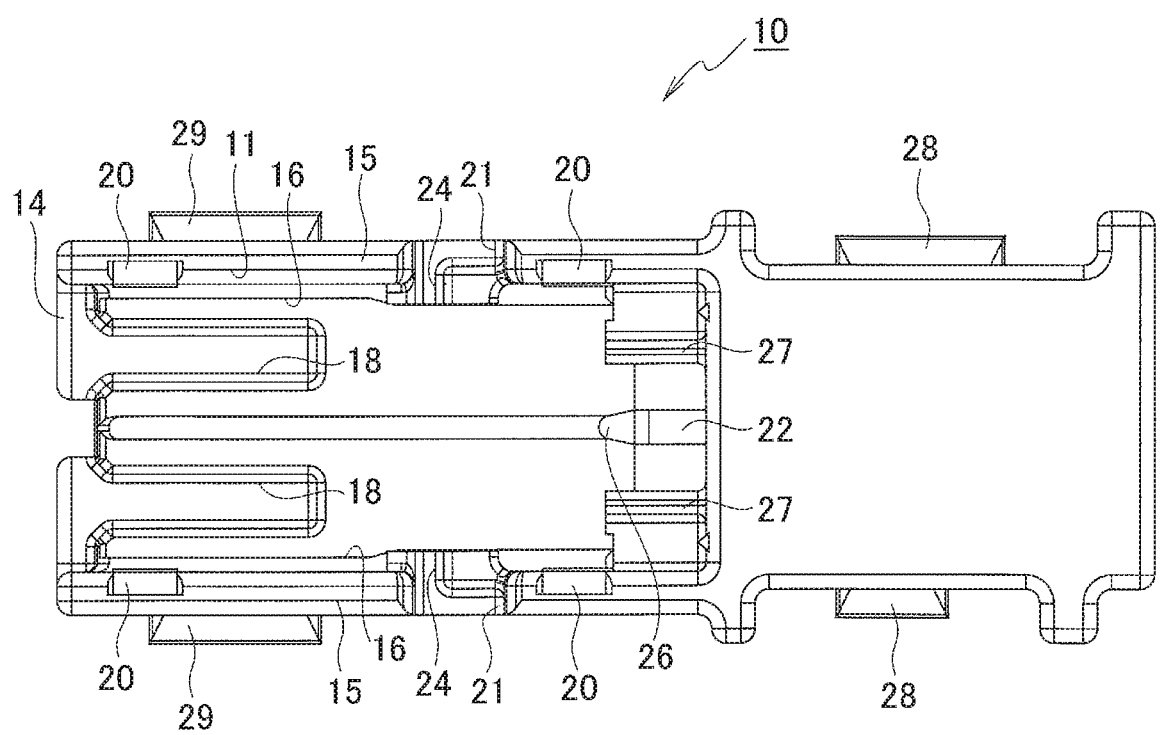
FIG. 8 is a plan view of the housing according to the embodiment of the present invention.

As illustrated in FIGS. 1 to 2B, lighting units 1A and 1B each include a light emitting diode (LED) 2 that is a light source, a circuit board 3 that is a circuit body constituting a circuit between the light emitting diode 2 and the outside of a housing 10, a pair of bus bars 30, and the housing 10 that houses the light emitting diode 2, the circuit board 3, and the pair of bus bars 30. The housing 10 is provided with a cover (first cover) 40 of a first aspect and a cover (second cover) 50 of a second aspect in a selectively mountable manner. When the cover 50 of the second aspect is mounted, the inner member 60 is assembled to the housing 10. Hereinafter, the detailed configuration of each component will be described.

Housing

As illustrated in FIGS. 5 to 8 and the like, the housing 10 is formed of a member that does not transmit light. The general outer shape of the housing 10 is rectangular parallelepiped. The housing 10 has a component housing chamber 11 and a connector fitting chamber 12. A partition wall 13 is provided between the component housing chamber 11 and the connector fitting chamber 12. The component housing chamber 11 is surrounded by a bottom wall 14, a pair of side walls 15, and the partition wall 13, and the upper surface and the front surface are opened. These opening portions are covered by the cover 40 of the first aspect or the cover 50 of the second aspect. In the component housing chamber 11, the light emitting diode 2, the circuit board 3 on which the light emitting diode 2 is mounted, and a bus bar 30 are housed.

A pair of bus bar guide rails 16 is formed by a step lower by one step than the bottom surface of the periphery on the bottom wall 14 of the component housing chamber 11. The pair of bus bar guide rails 16 extend toward the partition wall 13 from the front-side opening of the component housing chamber 11. On the bottom wall 14 of the component housing chamber 11, a pressing portion entering groove 18 is formed on the bottom surface side of each bus bar guide rail 16.

On the inner surfaces of the pair of side walls 15 of the component housing chamber 11, a pair of locking projections 20 are provided at two locations. Each locking projection 20 is formed by cutting out the inner surface side of the side wall 15. That is, the upper surface of each locking projection 20 has the same height as the height of the inner surface of the other side wall 15.

On the pair of side walls 15 of the component housing chamber 11, a pair of deformation restricting grooves 21 is provided at one position between the two locking projections 20 on each side wall 15. Each deformation restricting groove 21 has an open top surface and is rectangular when viewed from the side.

A pair of inner member holding grooves 24 is provided on the pair of side walls 15 of the component housing chamber 11. Each inner member holding groove 24 is located at a lower position than each deformation restricting groove 21 and opens into the deformation restricting groove 21.

An inner member support base 22 is provided at the center position of the partition wall 13. A board positioning projection 26 is projected on the rear surface of the inner member support base 22. A pair of terminal through holes 25 is provided on the partition wall 13 at left and right positions thereof. Each terminal through hole 25 penetrates between the component housing chamber 11 and the connector fitting chamber 12. In addition, a pair of bus bar restricting walls 27 projecting toward a side of the component housing chamber 11 is provided on the partition wall 13 and the side wall 15.

Lens cover lock projections 28 that are a pair of housing-side attachment portions are each provided on each of the pair of side walls 15 of the housing 10, specifically on each of the outer surface sides of the connector fitting chamber 12. The pair of lens cover lock projections 28 is locked in a pair of locking holes 93 of the lens cover 90 that is a lighting attachment member, as described in detail below.

A pair of cap lock projections 29 is provided on the pair of side walls 15 of the housing 10, specifically on the outer surface side of the component housing chamber.

Bus Bar

Figure 9:
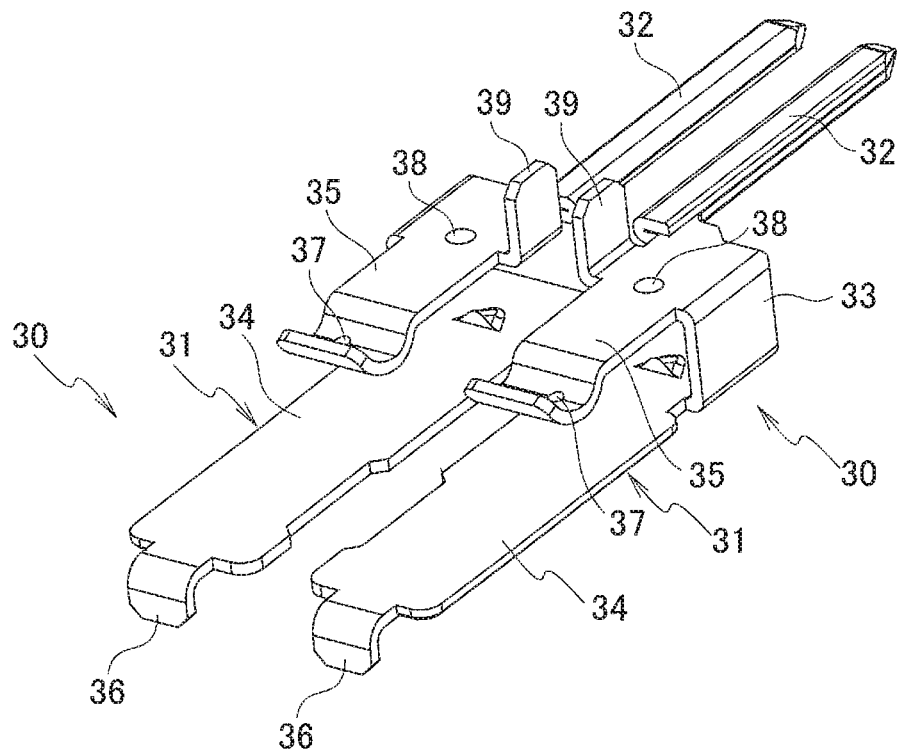
FIG. 9 is a perspective view of a pair of bus bars according to the embodiment of the present invention.

As illustrated in FIG. 9 and the like, each bus bar 30 is formed by bending a conductive metal plate having a predetermined shape. Each bus bar 30 has a board contact portion 31 that is a part to be electrically connected to the circuit board 3 and a tab terminal 32 that is a part to be electrically connected to external wiring (not illustrated) guided to the housing 10. The board contact portion 31 has a plate-like fixed contact portion 34 and a spring contact portion 35 that are arranged while being opposed to each other with a space therebetween via a connection plate 33 and a connection plate 33. The fixed contact portion 34 is formed to be longer than the spring contact portion 35. At the tip of the fixed contact portion 34, a pressing piece portion 36 bent at right angle is provided. The size of the pressing piece portion 36 is formed to be slightly smaller than the cross sectional dimension of a pressing portion entering groove 18. The side surface and the bottom surface of the pressing piece portion 36 move while approaching the side surface and the bottom surface of the pressing portion entering groove 18.

The spring contact portion 35 is cantilevered on the connection plate 33. A distal end of the spring contact portion 35 is formed in a circular arc shape bent toward the fixed contact portion 34. At a circular arc shaped portion of the spring contact portion 35, an indent portion 37 projecting toward the fixed contact portion 34 is provided.

A projection 38 is provided on the spring contact portion 35. At a position where the bus bar 30 is housed in the housing 10 (bus bar insertion completion position), the projection 38 abuts on the bus bar restricting wall 27 of the partition wall 13 (see FIG. 16B).

A gripping piece portion 39 bent at right angle is provided on the spring contact portion 35. The gripping piece portion 39 is provided to stand in a direction toward an upper opening of the component housing chamber 11 in a posture when the gripping piece portion 39 is housed in the housing 10.

The tab terminal 32 is arranged in the connector fitting chamber 12 at a housing position in the housing 10.

Light Emitting Diode and Circuit Board

Figure 10:
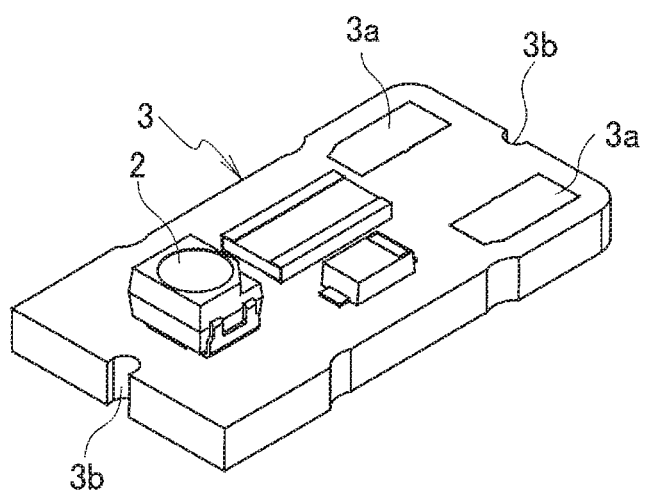
FIG. 10 is a perspective view of a circuit board according to the embodiment of the present invention.

As illustrated in FIG. 10 and the like, the light emitting diode 2 is mounted on the circuit board 3.

On the circuit board 3, other electronic components are mounted together with the light emitting diode 2, and a circuit pattern is provided to constitute a drive circuit of the light emitting diode 2. A pair of contact portions 3a is formed as part of the circuit pattern. The pair of contact portions 3a is arranged on corresponding upper and lower surfaces of the circuit board 3 (in the drawings, the contact portion on the back surface is not illustrated). At a housing position in the component housing chamber 11, a pair of contact portions 3a is clamped between the fixed contact portion 34 and the spring contact portion 35 of the bus bar 30. The spring return force of the spring contact portion 35 is used as contact pressure, and the board contact portion 31 and the circuit board 3 are electrically connected.

The circuit board 3 is a flat rectangular parallelepiped, and positioning grooves 3b are provided on the insertion front end surface and the insertion rear end surface of the circuit board 3 to be inserted into the component housing chamber 11. At a housing position in the component housing chamber 11, the board positioning projection 26 of the partition wall 13 enters the positioning groove 3b on the insertion front end surface of the circuit board 3. At a housing position in the component housing chamber 11, a board positioning projection 47 of the cover 40 of the first aspect or a board positioning projection 64 of the inner member 60 enters the positioning groove 3b of the insertion rear end surface of the circuit board 3.

Cover of First Aspect

Figure 11A:
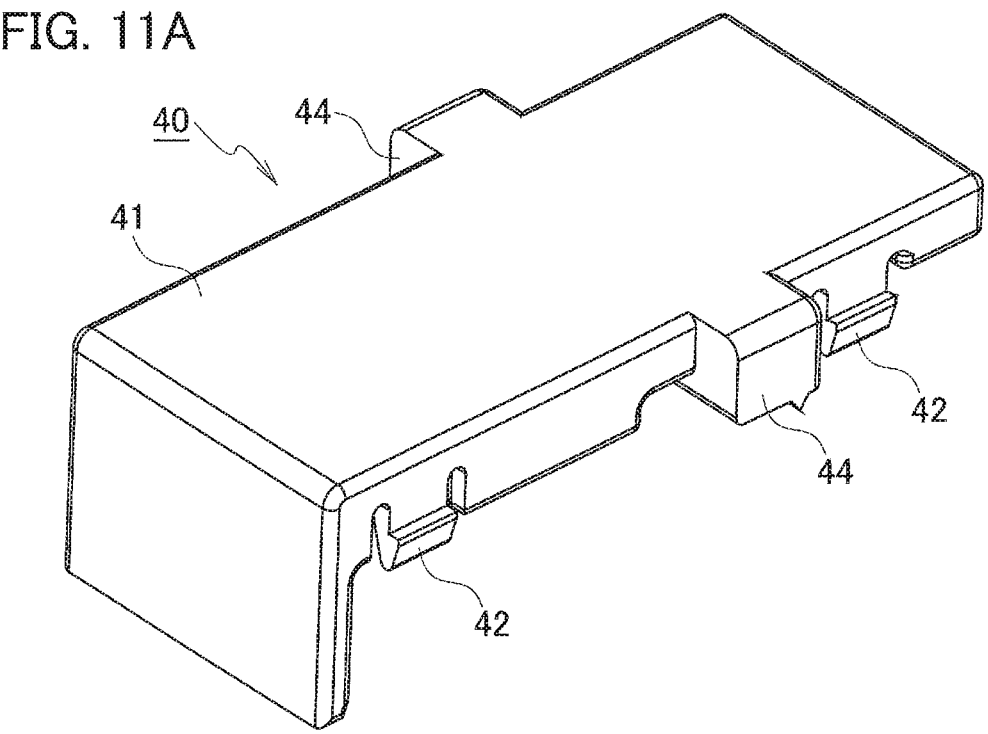
FIG. 11A is a perspective view of a front side of the cover of the first aspect according to the embodiment of the present invention.
Figure 11B:
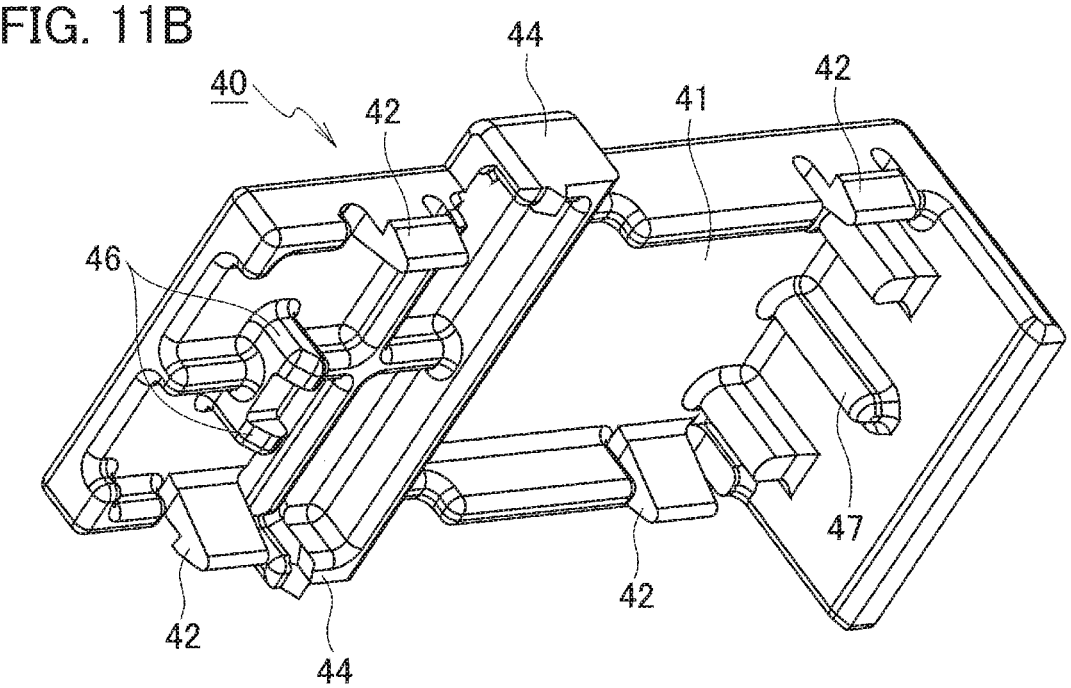
FIG. 11B is a perspective view of an inner surface side of the cover of the first aspect according to the embodiment of the present invention.

As illustrated in FIGS. 11A, 11B and the like, the cover 40 of the first aspect is formed of a member that transmits light. The cover 40 of the first aspect has an L-shaped closing plate portion 41 that enters the upper opening and a front opening of the component housing chamber 11 of the housing 10 with no gap. The upper surface height of the closing plate portion 41 is the upper surface height of the housing 10.

On both side surfaces of the closing plate portion 41, a pair of lock claws 42 is provided at two positions. Each lock claw 52 projects outward from the side surface of a closing plate portion 51.

On both side surfaces of the closing plate portion 41, a pair of deformation restricting ribs 44 is projected at positions between two pairs of lock claws 42. The pair of deformation restricting ribs 44 project outward from the pair of lock claws 42.

On the inner surface of the closing plate portion 41, a pair of bus bar coming-off preventing ribs 46 is projected downward. With the cover 40 of the first aspect mounted on the housing 10, the bus bar coming-off preventing ribs 46 are located on a side on which the bus bar comes off, which is a side of the gripping piece portion 39 of the bus bar 30.

The board positioning projection 47 is provided on the inner surface of the front surface portion of the closing plate portion 41. With the cover 40 of the first aspect mounted on the housing 10, the board positioning projection 47 enters the positioning groove 3b of the insertion rear end surface of the circuit board 3.

In the cover 40 of the first aspect, the deformation restricting ribs 44 enter the deformation restricting grooves 21 of the housing 10, and each lock claw 42 is locked by each locking projection 20 of the housing 10, whereby the cover 40 is mounted on the housing 10. In the cover 40 of the first aspect, when the pair of bus bars 30 and the circuit board 3 are housed in the housing 10 improperly, some portion improperly interferes with the pair of bus bars 30 and the circuit hoard 3, and the locking projection 20 is not locked by the lock claw 42.

When the cover 40 of the first aspect is mounted on the housing 10, the lighting unit 1A having a light emitting mode in which light is emitted (output) from almost the entire area of the cover 40 of the first aspect (see FIG. 2A) is obtained.

Cover of Second Aspect

Figure 12:
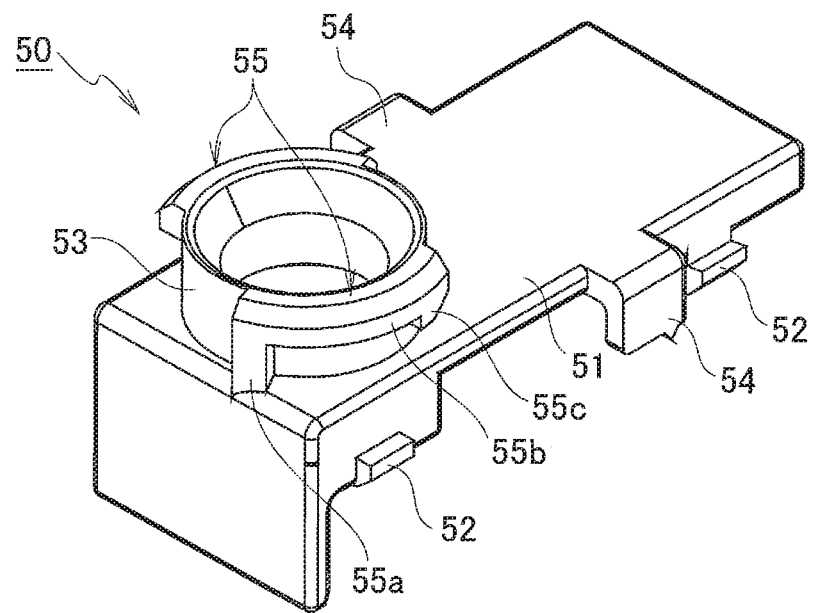
FIG. 12 is a perspective view of a cover of the second aspect according to the embodiment of the present invention.

As illustrated in FIG. 12 and the like, the cover 50 of the second aspect is formed of a member that does not transmit light. The cover 50 of the second aspect has an L-shaped closing plate portion 51 that enters the upper opening and the front opening of the component housing chamber 11 of the housing 10 with no gap. The upper surface height of the closing plate portion 51 is the upper surface height of the housing 10.

A cylindrical portion (tube portion) 53 as a rotation supporting portion is provided on the upper surface side of the closing plate portion 51. The cylindrical portion 53 projects from the upper surface of the closing plate portion 51. The interior of the cylindrical portion 53 is formed as an opening (space). On the outer periphery of the cylindrical portion 53, a cover-side attachment portion 55 is provided.

The cover-side attachment portion 55 is provided along the outer peripheral surface of the cylindrical portion 53. The cover-side attachment portion 55 has a pair of rotation stopper walls 55a, elastic circular arc arm portions 55b, and locking claws 55c. The pair of rotation stopper walls 55a is arranged at positions on the cylindrical portion 53 so as to be opposed to each other at 180 degrees, and projects from the outer periphery of the cylindrical portion 53. Each elastic circular arc arm portion 55b extends along the outer peripheral surface of the cylindrical portion 53 with each rotation stopper wall. 55a as a cantilever support portion. The locking claw is provided at the tip of each elastic circular arc arm portion 55b.

The cover 50 of the second aspect is attached to an attachment hole 101 (illustrated in FIG. 27) of the lighting attachment member (for example, the trim of a vehicle body panel) 100 by the cover-side attachment portion 55 provided on the outer periphery of the cylindrical portion 53. An attachment procedure will be described below.

Also in the cover 50 of the second aspect, a pair of lock claws 52 and a pair of deformation restricting ribs 54 similar in structure to those of the cover 40 of the first aspect is provided at two positions. In the cover 50 of the second aspect, the deformation restricting ribs 54 enter the deformation restricting grooves 21 of the housing 10, and each lock claw 52 is locked by each locking projection 20 of the housing 10, whereby the cover 50 is mounted on the housing 10. In the cover 50 of the second aspect, when the pair of bus bars 30 and the circuit board 3 are housed in the housing 10 improperly, some portion improperly interferes with the pair of bus bars 30 and the circuit board 3, and the locking projection 20 is not locked by the lock claw 52.

When the cover 50 of the second aspect and the inner member 60 described below are mounted on the housing 10, a lighting unit 1B having a light emitting mode in which light is emitted (output) only from the cylindrical portion 53 (see FIG. 23) is obtained.

Inner Member

Figure 13:
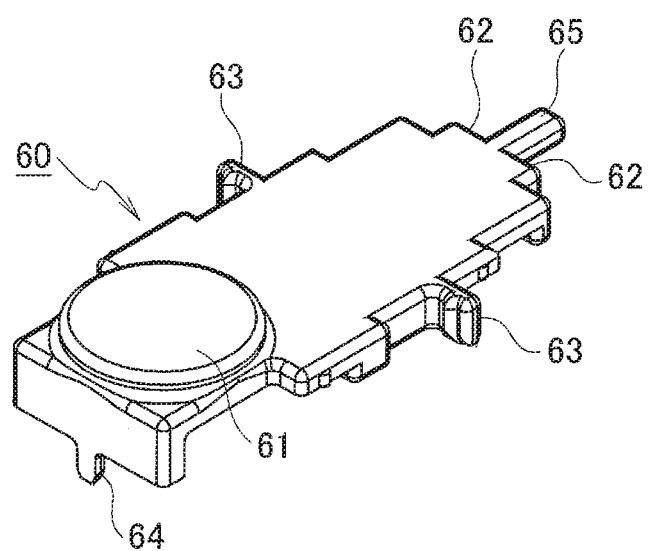
FIG. 13 is a perspective view of an inner member according to the embodiment of the present invention.

As illustrated in FIG. 13 and the like, the inner member 60 is formed of a member that transmits light. The inner member 60 is formed in a size such that the inner member 60 enters the upper opening of the component housing chamber 11 of the housing 10 with almost no gap. In the inner member 60, a circular portion 61 that is higher by one step than the periphery is provided at a position where the circular portion 61 comes directly above the light emitting diode 2 with the inner member 60 housed in the component housing chamber 11. In the inner member 60, a pair of bus bar coming-off preventing shoulder surfaces 62 is formed. With the inner member 60 housed in the component housing chamber 11, the pair of bus bar coming-off preventing shoulder surfaces 62 is located on a bus bar coming-off side of the gripping piece portion 39 of the bus bar 30.

A pair of side end weight receiving ribs 63 is projected on both side edges of the inner member 60. A distal end self-weight receiving rib 65 is provided at a distal end of the inner member 60. With the inner member 60 housed in the component housing chamber 11, the pair of side end weight receiving ribs 63 enters the pair of inner member holding grooves 24 and is placed on the bottom surface thereof, and the distal end self-weight receiving rib 65 is placed on the inner member support base 22 of the housing 10. The board positioning projection 64 is provided on the inner member 60. With the inner member 60 housed in the component housing chamber 11, the board positioning projection 64 enters the positioning groove 3b on the insertion rear end surface of the circuit board 3.

When the bus bars 30 and the circuit board 3 are housed in the housing 10 improperly, the inner member 60 has a function of preventing the cover 50 of the second aspect from being locked to the housing 10, that is, a half-fitting function.

First Cap

Figure 23A:
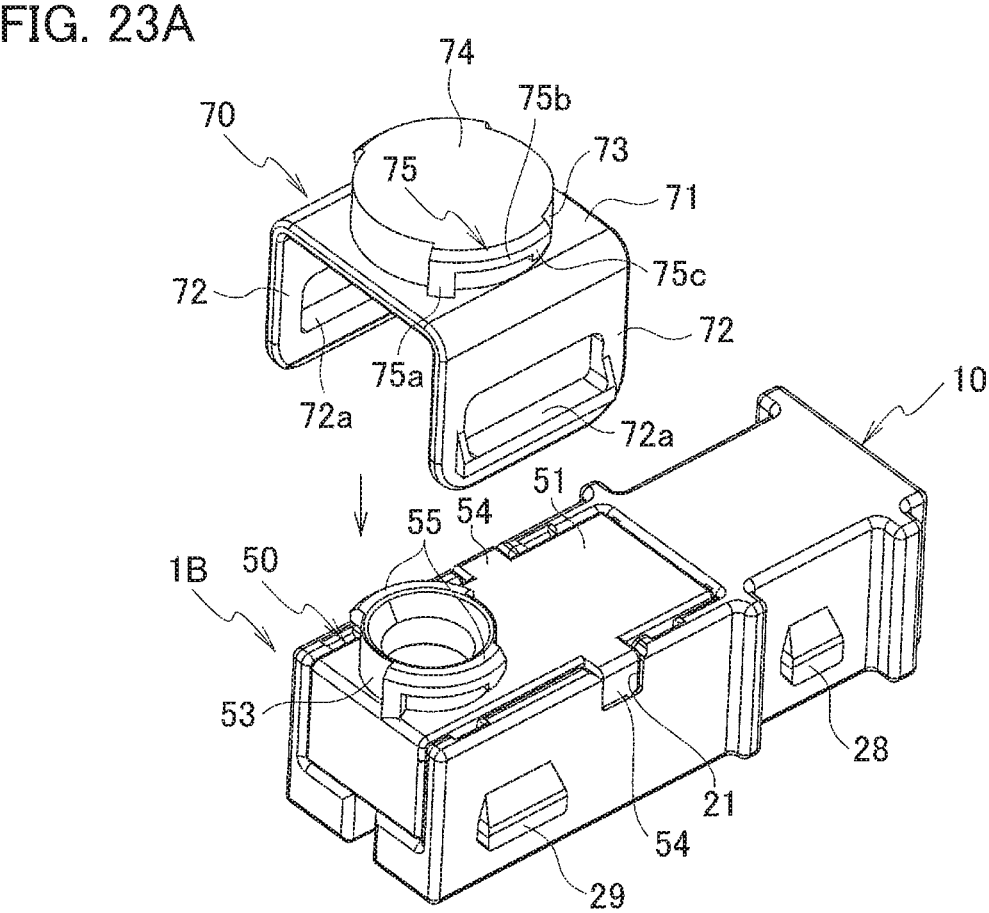
FIG. 23A is a perspective view illustrating before a first cap is mounted on the housing according to the embodiment of the present invention.
Figure 23B:
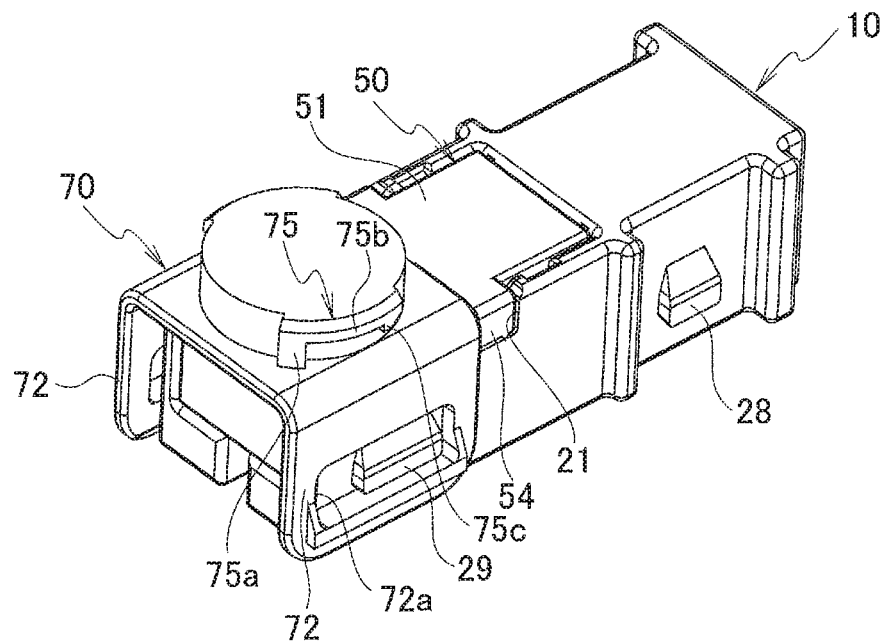
FIG. 23B is a perspective view of the lighting unit with the first cap mounted thereon according to an embodiment of the present invention.

As illustrated in FIGS. 23A and 23B, a first cap 70 is formed of a member that transmits light. The first cap 70 includes a cap body 71 and a pair of elastic locking arm portions 72 extending from both side edges of the cap body 71 via bent portions.

The cap body 71 has a cylindrical portion 73 projecting from a peripheral surface and a design cover portion 74 covering an upper surface inside the cylindrical portion 73. On the bottom surface side of the cap body 71, a fitting recess portion (not denoted by a reference numeral) is formed by the cylindrical portion 73 and the design cover portion 74. The circular fitting recess portion is formed in a size such that the cylindrical portion 53 of the cover 50 of the second aspect and the cover-side attachment portion 55 enter.

A cap-side attachment portion 75 having a structure similar to that of the cover-side attachment portion 55 of the cylindrical portion 53 of the cover 50 of the second aspect is provided outside the cylindrical portion 73. That is, the cap-side attachment portion 75 has a pair of rotation stopper walls 75a, a pair of elastic circular arc arm portions 75b cantilevered on the rotation stopper walls 75a, and a pair of locking claws 75c.

A lock hole 72a is formed in each of the pair of elastic locking arm portions 72.

The pair of elastic locking arm portions 72 is pressed from the upper side of the housing 10 into the outside of the left and right side walls 15 by using elastic deformation of the pair of elastic locking arm portions 72, and the pair of cap lock projections 29 of the housing 10 is locked in a pair of the lock holes 72a of the first cap 70. Thus, as illustrated in FIG. 23B, the first cap 70 is assembled to the lighting unit 1B with the cover 50 of the second aspect mounted thereon.

The lighting unit 1B with the first cap 70 mounted thereon becomes the lighting unit 1B having the light emitting mode in which the design cover portion 74 emits light from the surface thereof.

The lighting unit 1B with the first cap 70 mounted thereon can be attached to an attachment hole (not illustrated) of a lighting attachment member 100 by using the cap-side attachment portion 75.

Second Cap

Figure 24:
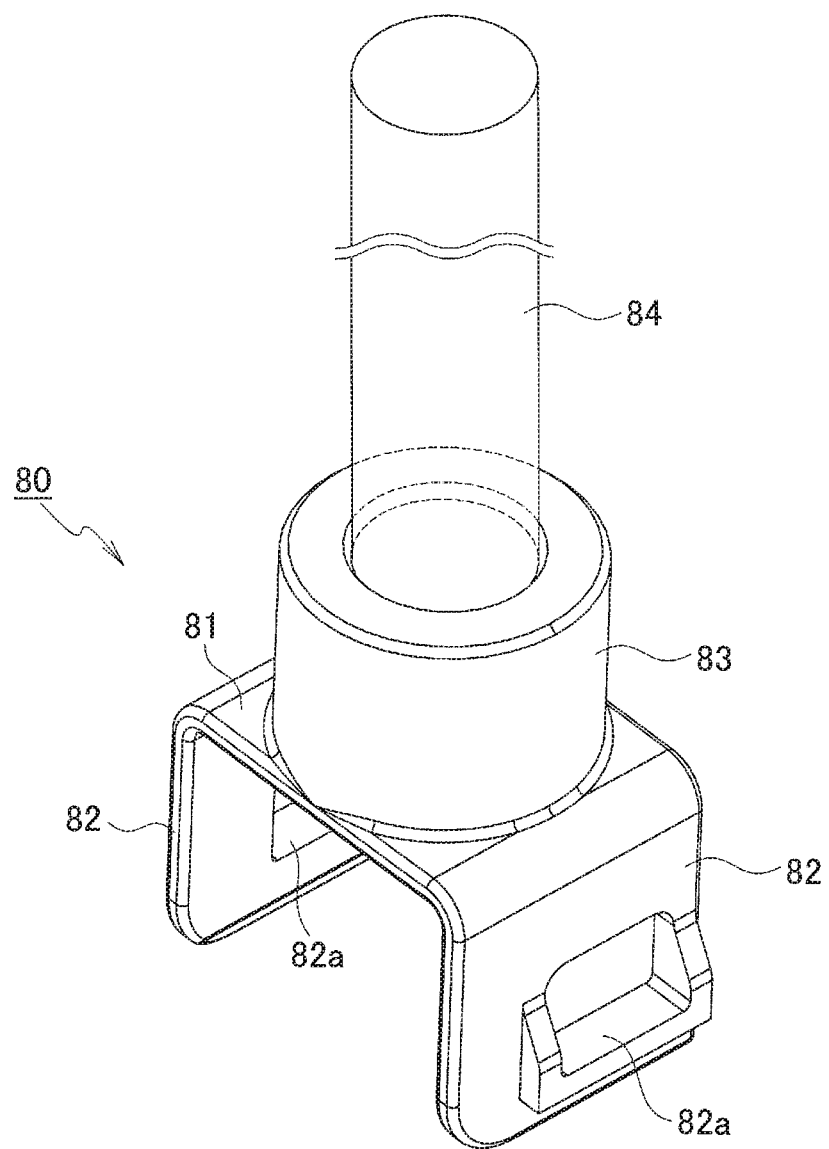
FIG. 24 is a perspective view of a second cap according to the embodiment of the present invention.

As illustrated in FIG. 24, a second cap 80 includes a cap body 81 formed of a member that does not transmit light and a pair of elastic locking arm portions 82 extending from both side edges of the cap body 81 via bent portions. The cap body 81 is provided with a cylindrical portion 83. The base portion of a light guiding rod 84 is inserted into the cylindrical portion 83. A portion other than the base portion of the light guiding rod 84 is exposed to the outside.

A lock hole 82a is formed in each of the pair of elastic locking arm portions 82. The second cap 80 is assembled to the housing 10 in a similar manner to that of the first cap 70.

The lighting unit 1B with the second cap 80 mounted thereon becomes the lighting unit 1B having a light emitting mode in which the light guiding rod 84 emits light from the surface thereof.

The lighting unit 1B with the second cap 80 mounted thereon can be attached to an attachment portion (not illustrated) of the lighting attachment member 100 by using the lens cover lock projections 28 that are the housing-side attachment portions.

Procedure for Assembling Lighting Unit

Next, a procedure for assembling the lighting units 1A and 1B will be described.

Figure 14:
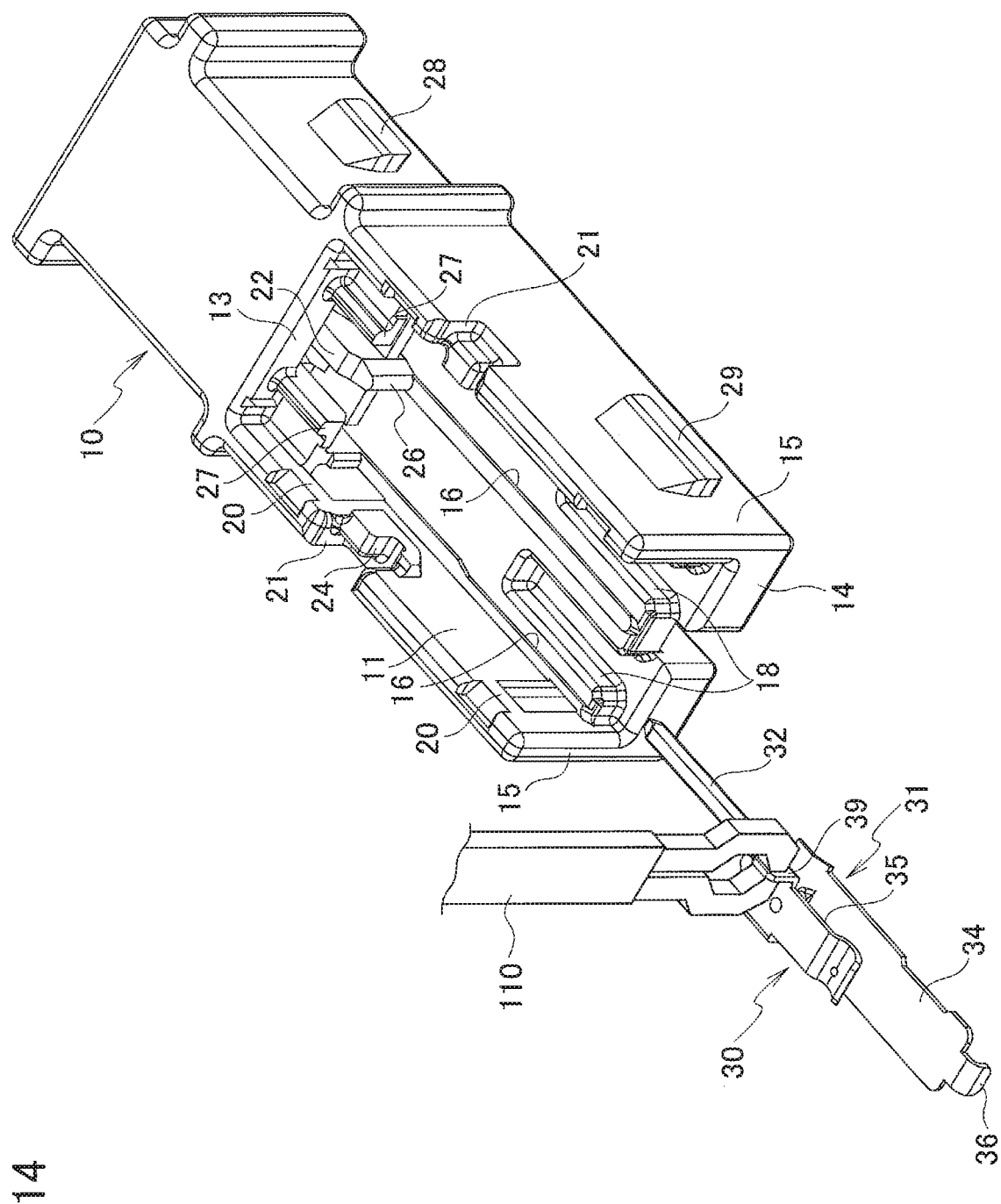
FIG. 14 is a perspective view illustrating a state in which the bus bar is gripped in a process of assembling the lighting unit according to the embodiment of the present invention.

As illustrated in FIG. 14, the gripping piece portion 39 of the bus bar 30 is gripped by a chuck jig 110, and the bus bar 30 is placed on the bus bar guide rail 16 of the component housing chamber 11 of the housing 10 with the tab terminal 32 of the bus bar 30 as a tip.

Figure 15:
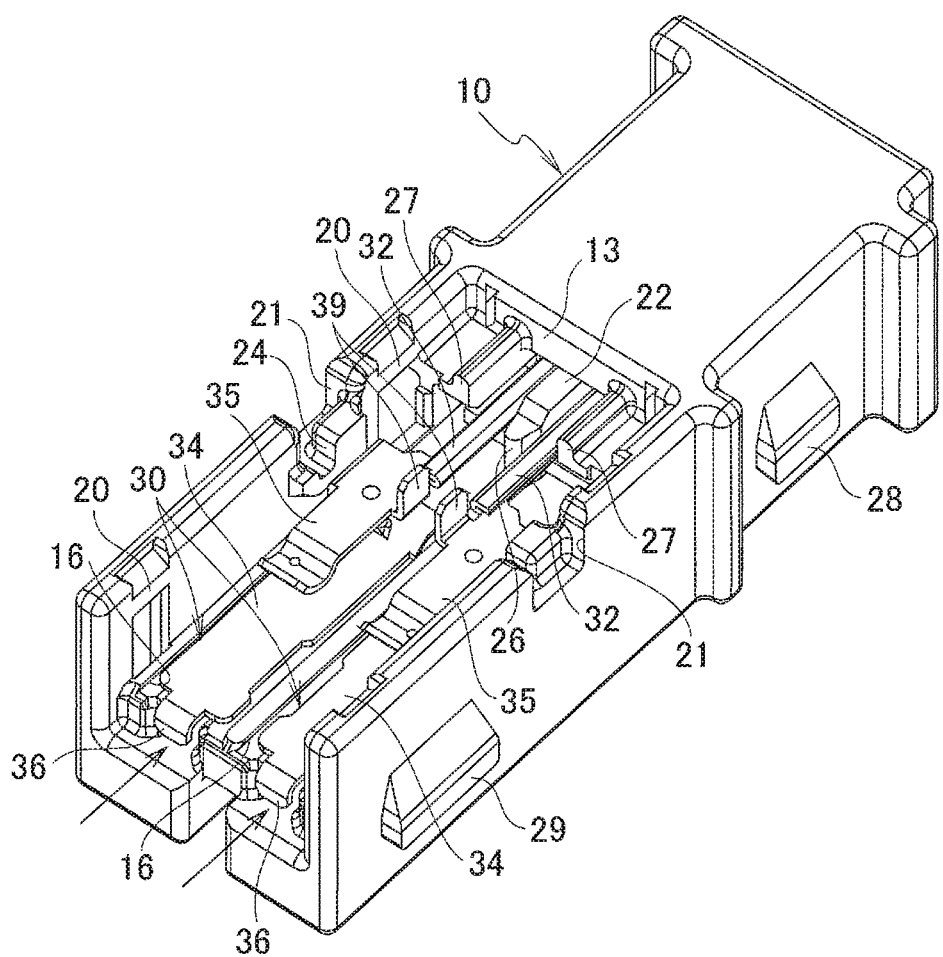
FIG. 15 is a perspective view illustrating a state in which the bus bar is placed on a bus bar guide rail in the process of assembling the lighting unit according to the embodiment of the present invention.

As illustrated in FIG. 15, the pressing piece portion 36 of each bus bar 30 placed on the bus bar guide rail 16 is pressed in the direction of the arrow. Then, each bus bar 30 is guided by the bus bar guide rail 16 and moves toward the back of the component housing chamber 11, and the tab terminal 32 goes into the terminal through hole 25 of the partition wall 13 and enters the connector fitting chamber 12. A position where the distal end of the connection plate 33 of the bus bar 30 hits the partition wall 13 is the bus bar insertion completion position.

Figure 16A:
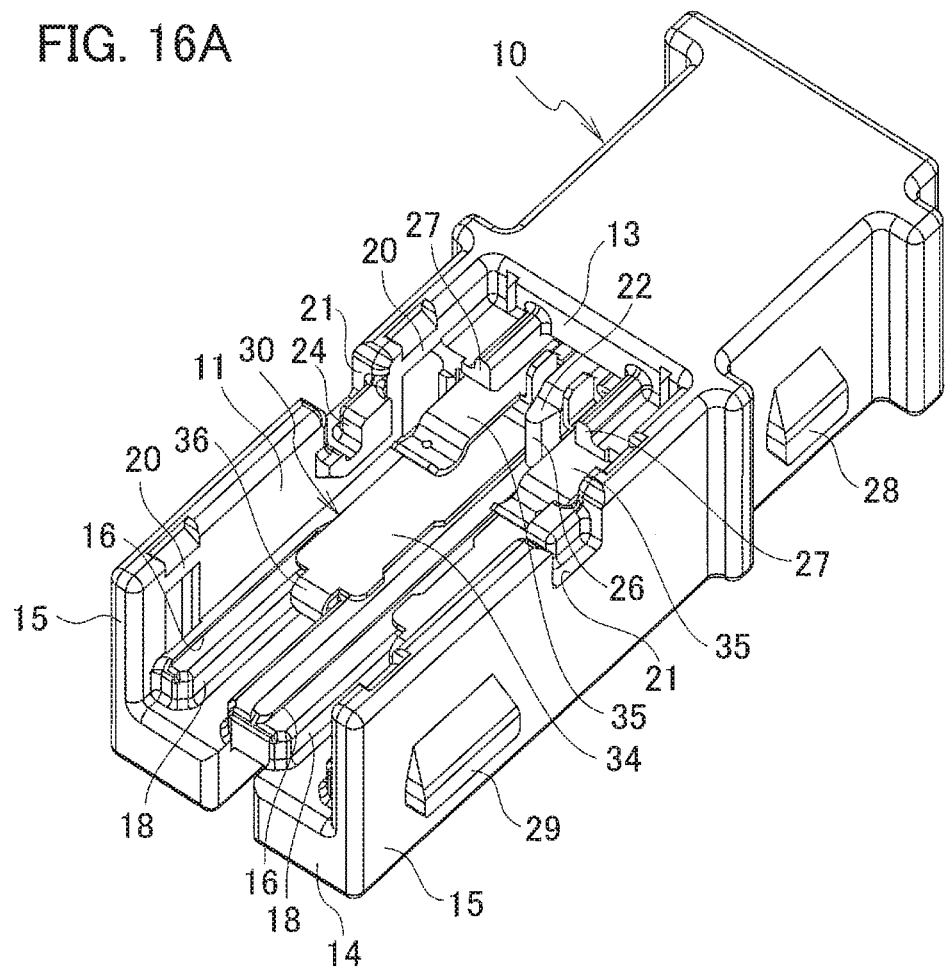
FIG. 16A is a perspective view illustrating a state in which the bus bar is located at an insertion completion position in the process of assembling the lighting unit according to the embodiment of the present invention.
Figure 16B:
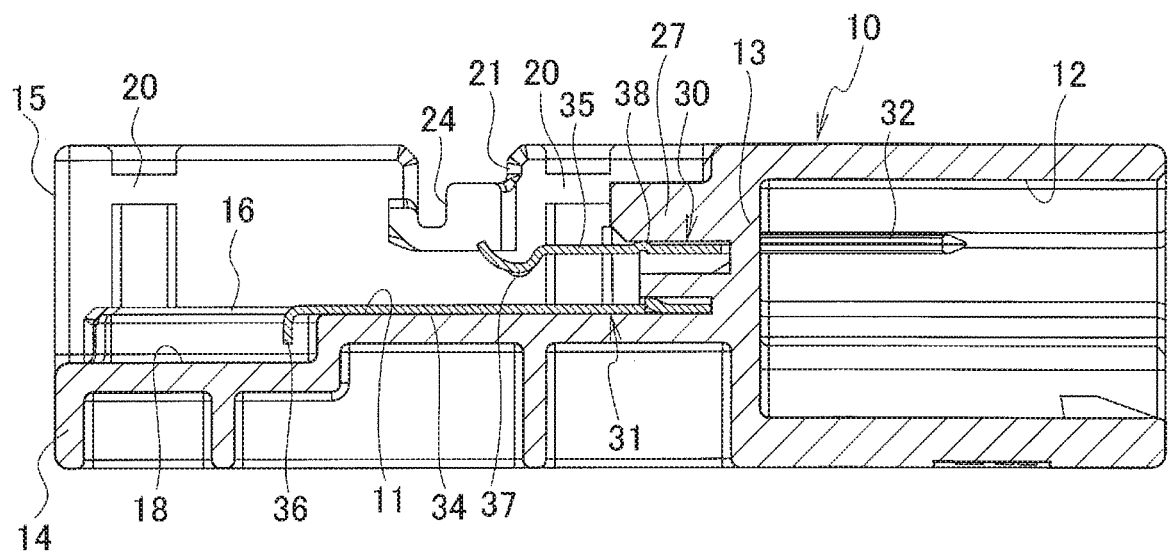
FIG. 16B is a cross-sectional view of the state in FIG. 16A.

As illustrated in FIGS. 16A and 16B, at the bus bar insertion completion position, the tab terminal 32 of each bus bar 30 is arranged in a projecting state in the connector fitting chamber 12, and the board contact portion 31 of the bus bar 30 is arranged in the component housing chamber 11. As illustrated in FIG. 16B, at the bus bar insertion completion position, the projection 38 of the spring contact portion 35 abuts on the bus bar restricting wall 27 of the partition wall 13.

Figure 17:
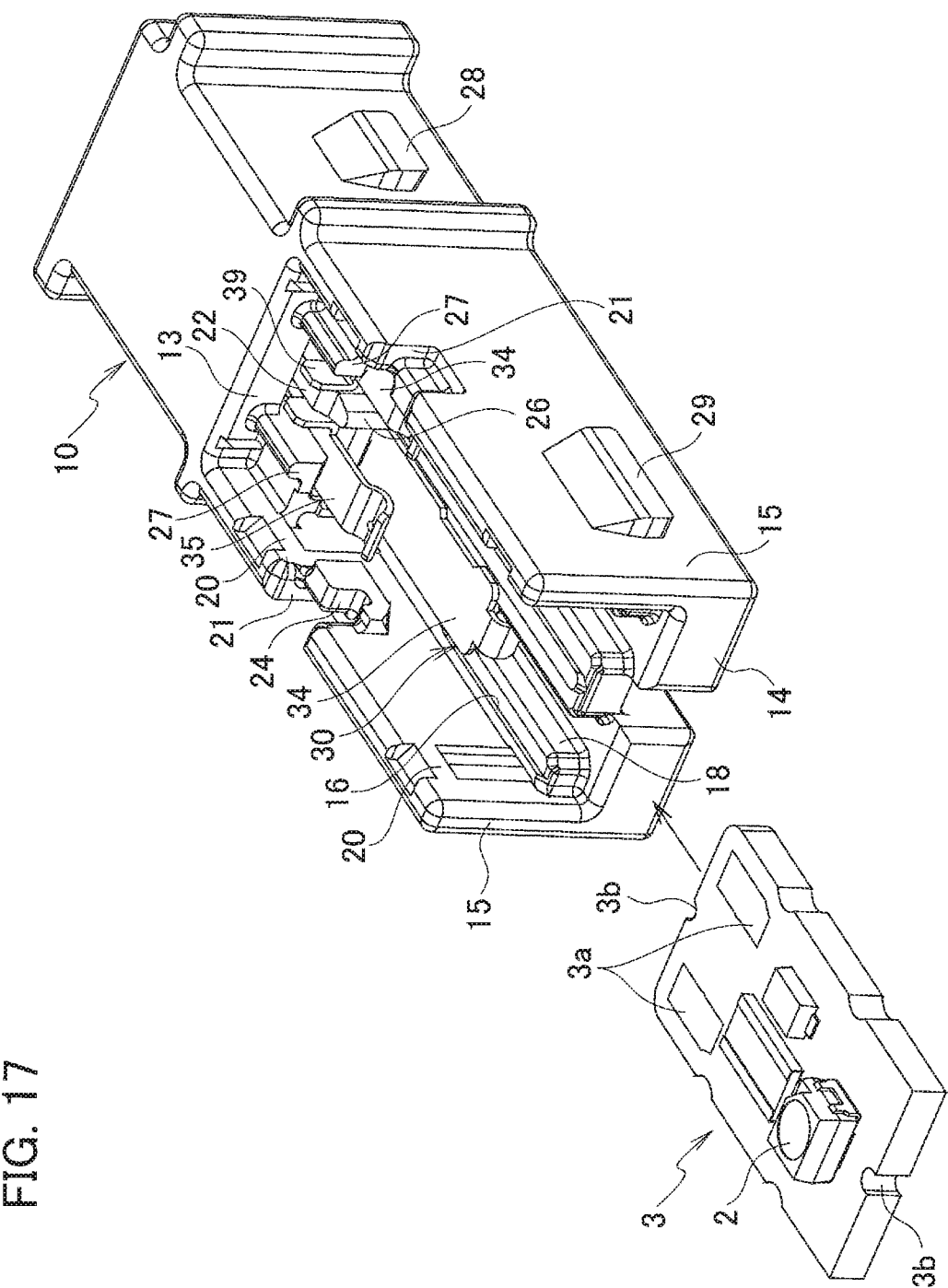
FIG. 17 is a perspective view illustrating a state in which insertion of a circuit board starts in the process of assembling the lighting unit according to the embodiment of the present invention.
Figure 18:
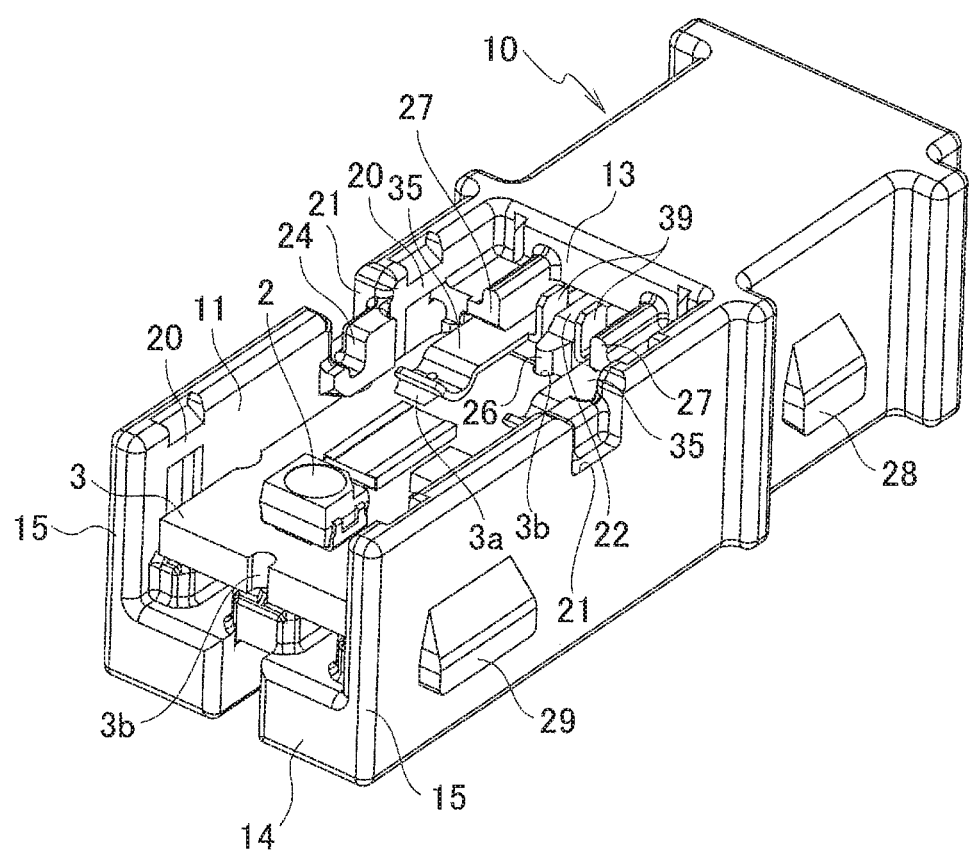
FIG. 18 is a perspective view illustrating a state in which the circuit board is located at an insertion completion position in the process of assembling the lighting unit according to the embodiment of the present invention.
Figure 19:
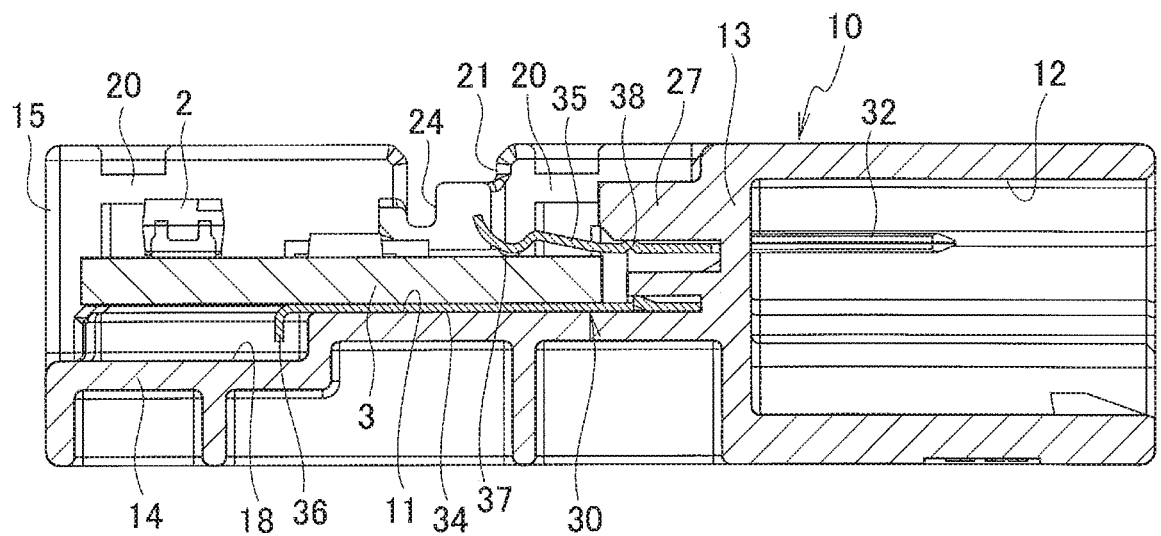
FIG. 19 is a cross-sectional view illustrating a state in which the circuit board is located at the insertion completion position in the process of assembling the lighting unit according to the embodiment of the present invention.

Next, as illustrated in FIG. 17, the circuit board 3 is inserted into the component housing chamber 11 of the housing 10. The insertion distal end side of the circuit board 3 enters between the fixed contact portion 34 and the spring contact portion 35 of the bus bar 30 in the process of inserting the circuit board 3 into the component housing chamber 11. A position where the board positioning projection 26 of the partition wall 13 enters and fits into the positioning groove 3b of the circuit board 3 is an insertion completion position of the circuit board 3. As illustrated in FIGS. 18 and 19, at the insertion completion position of the circuit board 3, the pair of contact portions 3a of the circuit board 3 are clamped between the fixed contact portion 34 and the spring contact portion 35 of the bus bar 30. The spring return force of the spring contact portion 35 is used as contact pressure, and the board contact portion 31 and the circuit board 3 are electrically connected.

Figure 20:
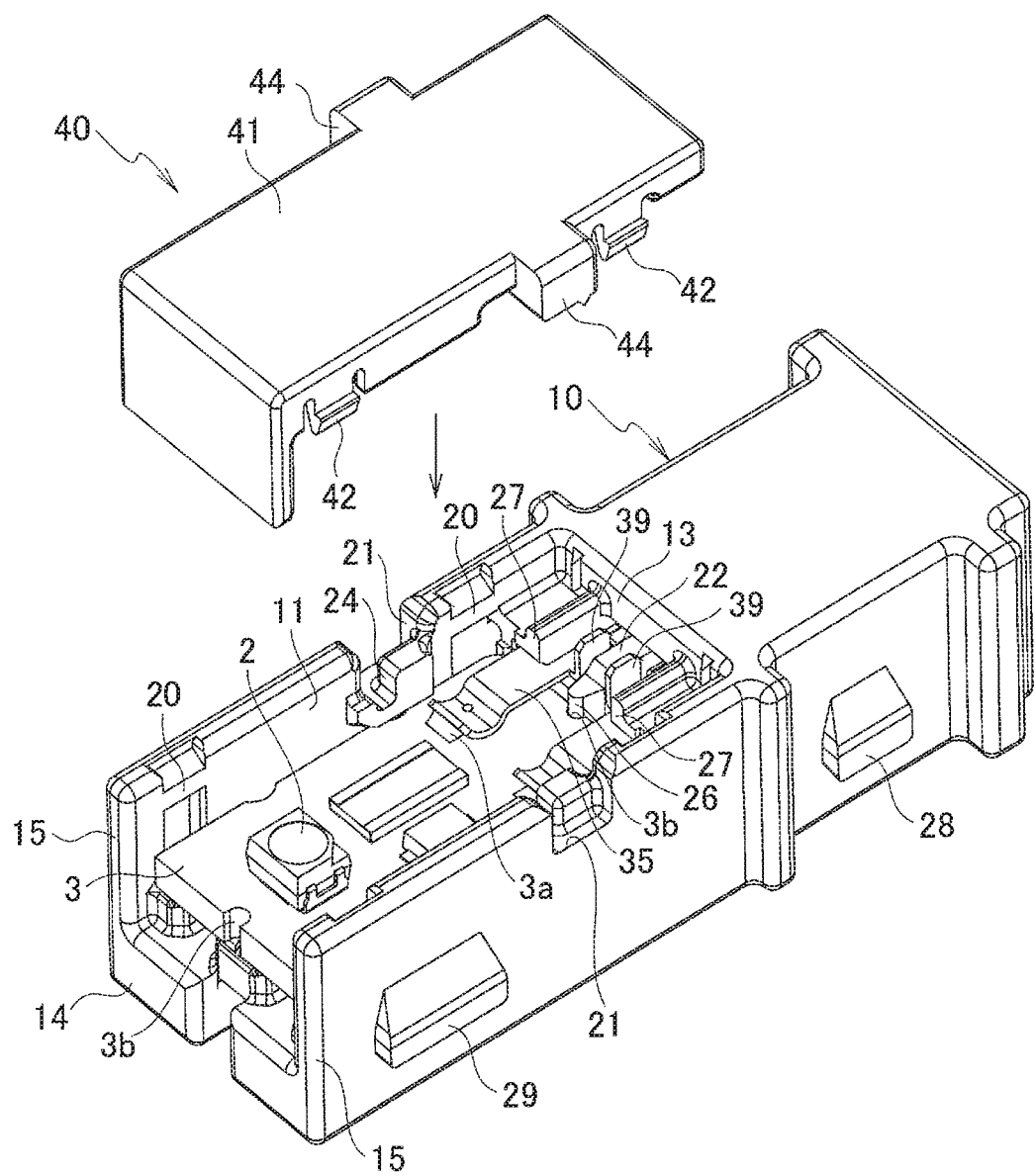
FIG. 20 is a side view illustrating a state before the cover of the first aspect is mounted in the process of assembling the lighting unit according to the embodiment of the present invention.

When the cover 40 of the first aspect is mounted, as illustrated in FIG. 20, the cover 40 of the first aspect is assembled from the upper side of the component housing chamber 11 of the housing 10. Then, the deformation restricting ribs 44 of the cover 40 of the first aspect enter the deformation restricting grooves 21 of the housing 10, and each lock claw 42 of the cover 40 of the first aspect elastically deforms, whereby the lock claw 42 is locked by each locking projection 20 of the housing 10. This completes the assembly of the lighting unit 1A with the cover 40 of the first aspect mounted thereon.

Figure 21:
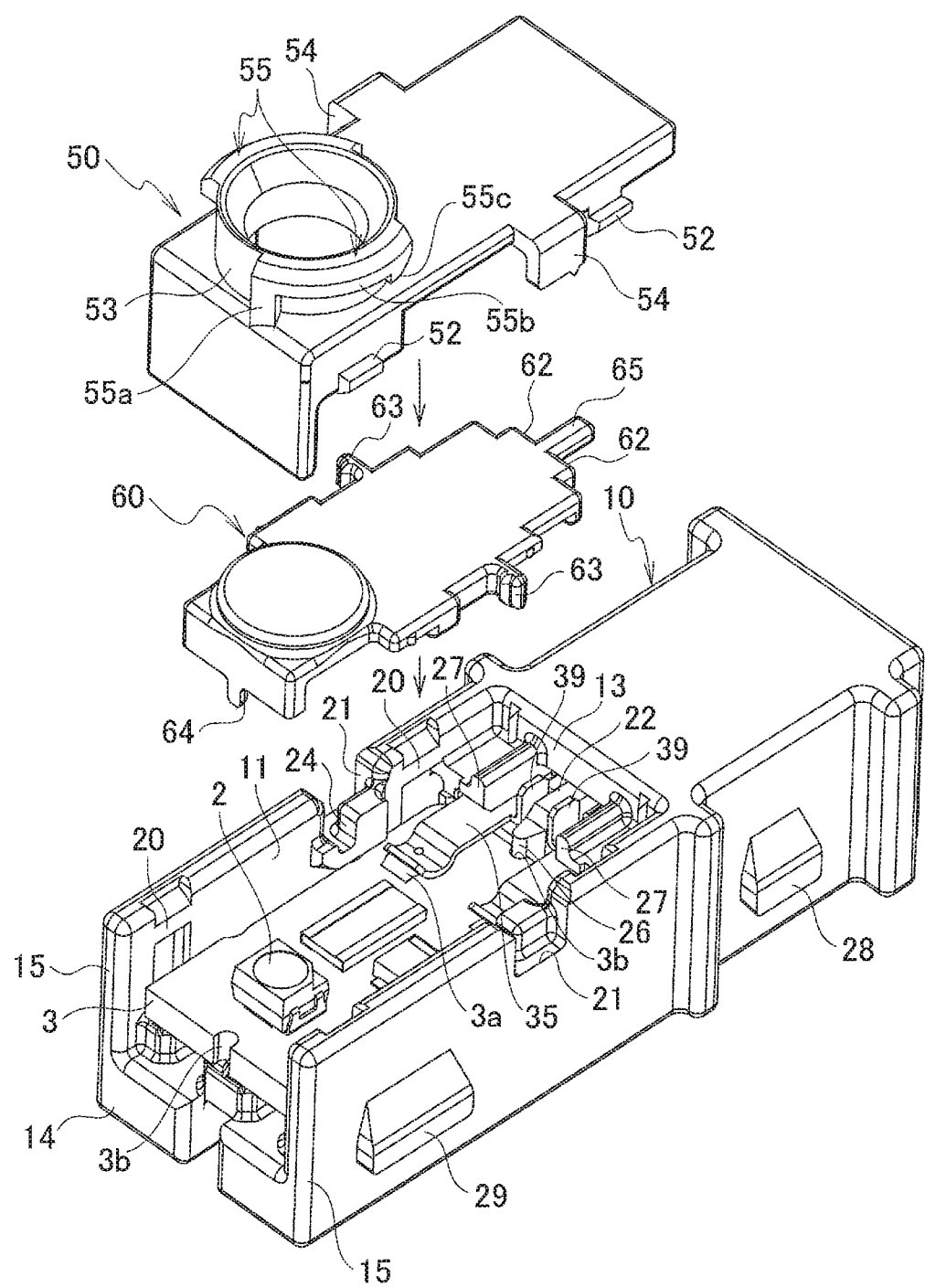
FIG. 21 is a perspective view illustrating before the cover of the second aspect and the inner member are mounted in the process of assembling the lighting unit according to the embodiment of the present invention.
Figure 22:
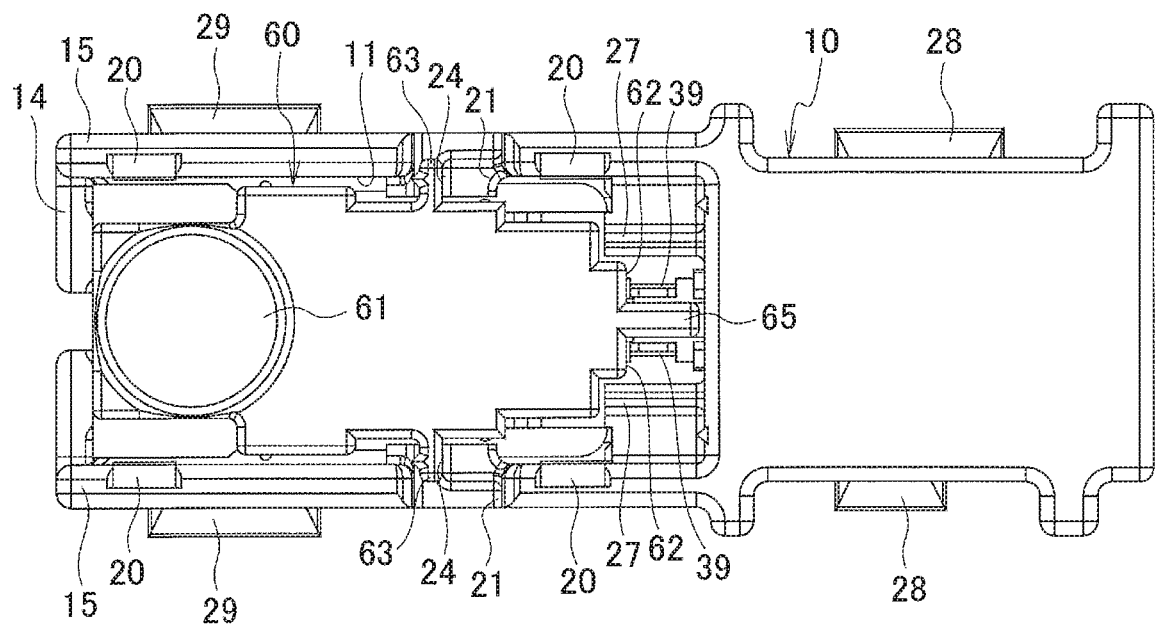
FIG. 22 is a plan view illustrating a state in which the inner member is assembled to the housing in the process of assembling the lighting unit according to the embodiment of the present invention.

When the cover 50 of the second aspect is mounted, as illustrated in FIG. 21, the pair of side end weight receiving ribs 63 is first aligned with the pair of inner member holding grooves 24 from above the component housing chamber 11 of the housing 10. Then, the inner member 60 is inserted into the component housing chamber 11 (see FIG. 22).

Next, the cover 50 of the second aspect is assembled from above the component housing chamber 11 of the housing 10. Then, the deformation restricting ribs 54 of the cover 50 of the second aspect enter the deformation restricting grooves 21 of the housing 10, and each lock claw 52 of the cover 50 of the second aspect elastically deforms, whereby the lock claw 52 is locked by each locking projection 20 of the housing 10. This completes the assembly of the lighting unit 1B with the cover 50 of the second aspect mounted thereon.

Procedure for Attaching Lighting Unit 1A to Lens Cover

Figure 25:
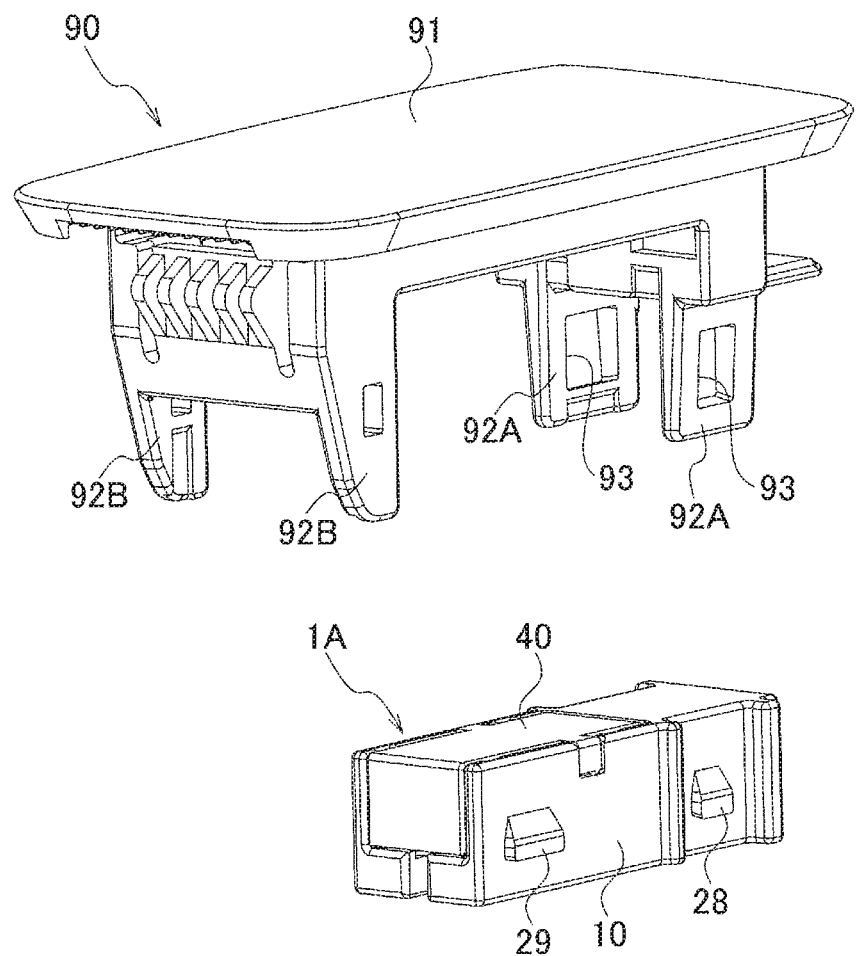
FIG. 25 is a perspective view illustrating a state before the lighting unit with the first cover mounted thereon is attached to a lens cover according to the embodiment of the present invention.
Figure 26:
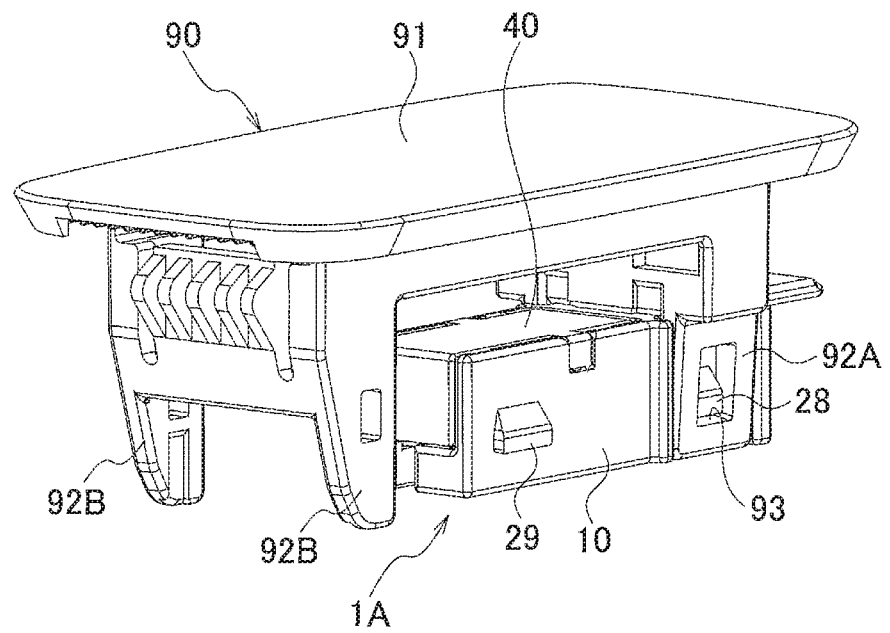
FIG. 26 is a perspective view illustrating a state after the lighting unit with the first cover mounted thereon is attached to the lens cover according to the embodiment of the present invention.

Next, a procedure for attaching the lighting unit 1A with the cover 40 of the first aspect mounted thereon to the lens cover 90 as a first lighting attachment member will be described. As illustrated in FIGS. 25 and 26, the lens cover 90 is formed of a member that transmits light. The lens cover 90 has a light emitting plate portion 91 and attachment leg portions 92A and 92B fixed to the back surface side of the light emitting plate portion 91. A pair of locking holes 93 is provided at distal ends of the pair of attachment leg portions 92A.

As illustrated in FIG. 25, the housing 10 of the lighting unit 1A is aligned with the pair of attachment leg portions 92A of the lens cover 90 and inserted into the pair of attachment leg portions 92A. Then, the pair of attachment leg portions 92A elastically deforms in a direction in which the pair of attachment leg portions 92A separates from each other. The housing 10 enters the pair of elastically deformed attachment leg portions 92A, and the pair of lens cover lock projections 28 is locked in the pair of locking holes 93 (see FIG. 26). This completes the mounting of the lighting unit 1A with the cover 40 of the first aspect mounted thereon to the lens cover 90. When the lens cover 90 with the lighting unit 1A mounted thereon is assembled to the vehicle body, the procedure is completed.

Procedure for Attaching Lighting Unit 1B to Attachment Hole

Figure 27:
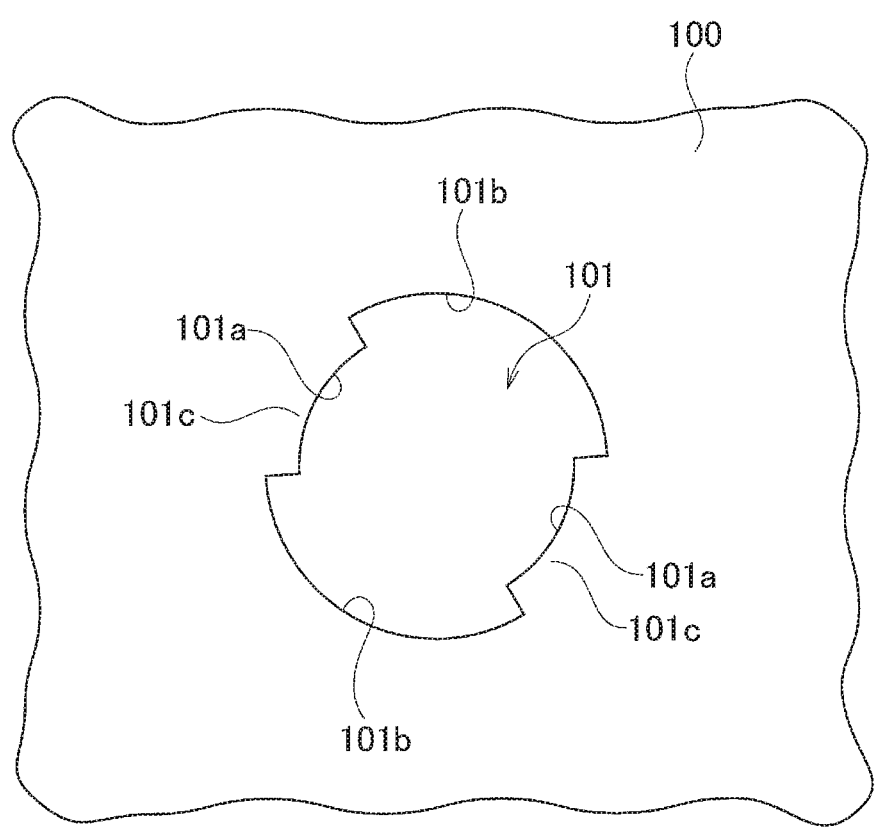
FIG. 27 is a front view of the periphery of an attachment hole of a lighting attachment member according to the embodiment of the present invention.

Next, a procedure for attaching the lighting unit 1B with the cover 50 of the second aspect mounted thereon to the attachment hole 101 of the lighting attachment member 100 will be described. As illustrated in FIG. 27, the attachment hole 101 of the lighting attachment member (for example, the trim of the vehicle body panel) 100 is an irregular circular hole in which a small diameter portion 101a and a large diameter portion 101b are combined and the outer edge side of the small diameter portion 101a is a clamping portion 101c.

The cover-side attachment portion 55 is first aligned with a position of the large diameter portion 101b, the cover-side attachment portion 55 is inserted into the attachment hole 101 together with the cylindrical portion 53, and the cover-side attachment portion 55 is inserted into a position where the cover-side attachment portion 55 protrudes to the opposite side of the lighting attachment member 100. Next, the cover-side attachment portion 55 is rotated. Then, the elastic circular arc arm portion 55b elastically deforms, the locking claw 55c is placed on the clamping portion 101c, and the rotation of the cover 50 of the second aspect is allowed. The locking claw 55c rotates to a position where the locking claw 55c gets over the clamping portion 101c. Then, the elastic circular arc arm portion 55b elastically recovers and deforms, and the rotation stopper walls 55a of the cover-side attachment portion 55 and the locking claw 55c clamp between both end surfaces of the clamping portion 101c. With this, the lighting unit 1B is attached to the attachment hole 101 of the lighting attachment member 100 using the cover 50 of the second aspect, and the installation of the lighting unit 1B is completed.

Assembly of Cap

As illustrated in FIG. 23A, in order to mount the first cap 70 to the lighting unit 1B with the cover 50 of the second aspect mounted thereon, the pair of elastic locking arm portions 72 is pressed from the upper side of the housing 10 into the outsides of the left and right side walls 15, by using the elastic deformation of the pair of elastic locking arm portions 72. Then, the cylindrical portion 53 of the cover 50 of the second aspect enters the fitting recess portion (not illustrated) of the first cap 70, and the pair of cap lock projections 29 of the housing 10 is locked in the pair of lock holes 72a of the first cap 70. Thus, the first cap 70 is mounted. The lighting unit 1B is of a light emitting mode in which the design cover portion 74 serves as the light emitting surface.

The second cap 80 illustrated in FIG. 24 can be mounted on the lighting unit 1B with the cover 50 of the second aspect mounted thereon in a similar manner to that of the first cap 70. The lighting unit 1B is of a light emitting mode in which the light guiding rod 84 emits light.

Effects of Embodiment

As described above, the lighting units 1A and 1B each includes a housing 10 that houses the light emitting diode 2, the circuit board 3 that is the circuit body constituting the circuit between the light emitting diode 2 and the outside of the housing 10, and the bus bars 30. The housing 10 includes the cover 40 of the first aspect that emits light from the light emitting diode 2 to the outside of the housing 10 and the cover-side attachment portion 55 attachable to the attachment hole 101 of the lighting attachment member 100. The cover 50 of the second aspect that emits light from the light emitting diode 2 to the outside of the housing 10 via the attachment hole 101 can be selectively mounted on the housing 10.

Therefore, when the cover 40 of the first aspect and the cover 50 of the second aspect are mounted, respectively, to the lighting units 1A and 1B, the lighting units 1A and 1B having different light emitting modes are obtained. In addition, when the cover 50 of the second aspect is mounted, the lighting unit 1B can be attached to the attachment hole 101 of the lighting attachment member 100 by using the cover 50 of the second aspect. By reassembling the cover in this manner, it is possible to obtain the lighting units 1A and 1B having different light emitting modes and attachment structures to the lighting attachment member 100. Therefore, components other than the covers 40 and 50 are made common.

The housing 10 is provided with the lens cover lock projections 28 that are housing-side attachment portions to be attached to the lens cover 90 that is the lighting attachment member 100. Therefore, the lighting unit 1A with the cover 40 of the first aspect mounted thereon can be attached to the lens cover 90 that is the lighting attachment member by using the lens cover lock projections 28. The lighting unit 1B with the cover 50 of the second aspect mounted thereon can be attached to the attachment hole 101 of the lighting attachment member 100 by using the cover-side attachment portion 55. In addition, the lighting unit 1B with the cover 50 of the second aspect mounted thereon can be attached to the lens cover 90 that is the lighting attachment member by using the lens cover lock projections 28. Therefore, the lighting unit 1B can correspond to different attachment structures.

Deformation restricting ribs 44, 54 are provided on the cover 40 of the first aspect and the cover 50 of the second aspect, respectively. The housing 10 is provided with deformation restricting grooves 21 that the deformation restricting ribs 44 and 54 selectively enter (that is, selectively accept the deformation restricting ribs 44 and 54). In addition, the cover-side attachment portion 55 is attached to the attachment hole 101 of the lighting attachment member 100 by rotation of the cover-side attachment portion 55.

Therefore, when the cover 50 of the second aspect is mounted on the housing 10 and the housing 10 is rotated to be rotatably attached to the attachment hole 101 of the lighting attachment member 100, the housing 10 receives reaction force from the cover 50 of the second aspect. However, since the housing 10 receives the reaction force at the deformation restricting grooves 21, it is possible to prevent the cover 50 of the second aspect from coming off from the housing 10 as much as possible.

The circuit body includes the circuit board 3 and the bus bar 30. The light emitting diode 2 is mounted on the circuit board 3. The bus bar 30 connects a part to be electrically connected to the circuit board 3 and a part electrically connected to the external wire (not illustrated) guided to the housing 10 from the outside. In the present embodiment, in addition to the housing 10, components of the light emitting diode 2, the circuit board 3, and the bus bar 30 are each made common. In addition, since at least the bus bar 30 and the circuit board 3 need to be housed in the housing 10, this configuration achieves good workability of assembly.

The cover 50 of the second aspect is formed of a member that does not transmit light and has a cylindrical portion 53 arranged in the attachment hole 101. A light transmissive inner member 60 that blocks the opening of the cylindrical portion 53 is housed in the housing 10. Therefore, it is possible to prevent foreign matters such as dust and water from entering the housing 10 through the opening in the cylindrical portion 53 of the cover 50 of the second aspect.

The housing 10 is provided with the first cap 70 and the second cap 80 in a mountable manner. The first cap 70 and the second cap 80 cover the cylindrical portion 53 of the cover 50 of the second aspect from the outside and emit light from the cylindrical portion 53 to the outside. Therefore, when the cover 50 of the second aspect is mounted, it is possible to increase variations of the light emitting mode. It is possible to increase variations of the light emitting mode also by increasing the kinds of the cap.

The first cap 70 is provided with a cap-side attachment portion 75 to be attached to an attachment hole of the lighting attachment member 100 (attachment hole for the cap is not illustrated). Therefore, in the lighting unit 1B with the first cap 70 mounted thereon, the lighting unit 1B can be mounted on the attachment hole of the lighting attachment member 100 by using the first cap 70. Note that in this embodiment, the attachment hole for attaching the first cap 70 has a larger diameter than that of the attachment hole 101 for attaching the cover 50 of the second aspect.

The bus bar guide rails 16 are provided on the bottom wall 14 of the component housing chamber 11 of the housing 10. Therefore, the bus bar 30 can be reliably and smoothly moved to the insertion completion position of the component housing chamber 11.

The pressing portion entering groove 18 is provided on the bottom wall 14 of the component housing chamber 11 of the housing 10 and the pressing piece portion 36 is provided on the bus bar 30. Therefore, the bus bar 30 can be easily moved to the insertion completion position of the component housing chamber 11. In addition, the pressing piece portion 36 is configured to be of a size such that the pressing piece portion 36 enters the pressing portion entering groove 18 with no gap and move therein. Therefore, since the pressing piece portion 36 moves in the pressing portion entering groove 18 while being hardly displaced in up, down, right, and left directions, the pressing piece portion 36 functions also as a guide for the bus bar 30. Furthermore, when the bus bar 30 is moved within the component housing chamber 11, a load is applied only to the pressing piece portion 36, and a load is not applied to the board contact portion 31 and the tab terminal 32. This prevents the board contact portion 31 and the tab terminal 32 from deforming.

The bus bar 30 is provided with the projection 38 on the spring contact portion 35. At a position where the bus bar 30 is housed in the housing 10 (bus bar insertion completion position), the projection 38 abuts on the bus bar restricting wall 27 of the partition wall 13 (see FIG. 16B). Then, as illustrated in FIG. 19, when the circuit board 3 is housed, the spring contact portion 35 flexurally deforms. At this time, excessive deformation of the spring contact portion 35 can be prevented, and since the projection 38 abuts on the bus bar restricting wall 27, a stable contact pressure can be secured.

The bus bar 30 is provided with the gripping piece portion 39. Therefore, it is easy to place the bus bar 30 on a proper insertion start position of the component housing chamber 11 of the housing 10, that is, on the bus bar guide rail 16.

The cover 40 of the first aspect is provided with the bus bar coming-off preventing ribs 46. With the cover 40 of the first aspect mounted on the housing 10, it is possible to prevent the gripping piece portion 39 of the bus bar 30 from moving in a direction in which the bus bar comes off.

In the lighting unit 1B with the cover 50 of the second aspect mounted thereon, the inner member 60 is housed in the component housing chamber 11 of the housing 10. Therefore, it is possible to prevent foreign substances such as dust, water, and the like from entering from the inside of the cylindrical portion 53 of the cover 50 of the second aspect into the component housing chamber 11 of the housing 10.

The inner member 60 is provided with a pair of bus bar coming-off preventing shoulder surfaces 62. With the cover 50 of the second aspect mounted on the housing 10, it is possible to prevent the gripping piece portion 39 of the bus bar 30 from moving in the direction in which the bus bar comes out.

When the inner member 60 is housed in the component housing chamber 11 in which the bus bar 30 and the circuit board 3 are arranged in a proper state, the pair of side end weight receiving ribs 63 enters the pair of inner member holding grooves 24 and is placed on the bottom surface thereof, and the distal end self-weight receiving rib 65 is placed on the inner member support base 22 of the housing 10, and the housing 10 receives the weight of the inner member 60. Therefore, even after the inner member 60 is assembled in the housing 10, the weight of the inner member 60 does not act on the circuit board 3 and the pair of bus bars 30. Therefore, the inner member 60 does not damage the circuit board 3 and the bus bars 30.

In the lighting unit 1A with the cover 40 of the first aspect mounted thereon, the board positioning projection 26 of the housing 10 enters the positioning groove 3b of the insertion front end surface of the circuit board 3, and the board positioning projection 47 of the cover 40 of the first aspect enters the positioning groove 3b of the insertion rear end surface of the circuit board 3. Therefore, the circuit board 3 is housed with the circuit board 3 positioned in the component housing chamber 11 of the housing 10.

In the lighting unit 1B with the cover 50 of the second aspect mounted thereon, the board positioning projection 26 of the housing 10 enters the positioning groove 3b of the insertion front end surface of the circuit board 3, and the board positioning projection 64 of the inner member 60 enters the positioning groove 3b of the insertion rear end surface of the circuit board 3. Therefore, the circuit board 3 is housed with the circuit board 3 positioned in the component housing chamber 11 of the housing 10.

Modification

In the above embodiment, the connector fitting chamber 12 is provided in the housing 10, the tab terminal 32 is provided on the bus bar 30, and an electric connection between the bus bar 30 and an electric wire guided from the outside is performed by connector connection. However, the electric connection may be performed by connection other than the connector connection. For example, a pressure contact blade terminal may be provided on the bus bar 30, and electric connection between the bus bar 30 and the electric wire guided from the outside may be performed by pressure welding connection.

In the above embodiment, the circuit body includes the circuit board 3 and the bus bar 30, but the circuit body is not limited thereto. For example, the circuit body may include a bus bar circuit body on which electronic components are mounted. In this case, the bus bar circuit body is preferably provided integrally with a tab terminal and a pressure contact blade terminal.

In the above embodiment, the projection 38 of the bus bar 30 abuts on the bus bar restricting wall 27 of the housing 10. However, the projection 38 may be arranged so as not to abut on the surface of the bus bar restricting wall 27 and to be spaced with a gap from the surface of the bus bar restricting wall 27 when the bus bar 30 is housed in the housing 10 and the circuit board 3 is not housed. When the spring contact portion 35 is pressed by the circuit board 3 and deforms, the projection 38 may abut on the bus bar restricting wall 27 of the partition wall 13 to prevent the excessive deformation of the spring contact portion 35 while the contact pressure is ensured. With such a configuration, insertion resistance in inserting the bus bar 30 into the housing 10 can be reduced, and the workability of assembling the bus bar 30 is improved.

In the above embodiment, when the cover 50 of the second aspect is mounted, the inner member 60 is housed in the housing 10. However, a light transmissive member may be provided by, for example, two-color molding in the cylindrical portion 53 of the cover 50 of the second aspect In the above-described embodiment, the cover 40 of the first aspect is of one type. However, if plural types of covers without a cover-side attachment portion and having different light emitting modes are prepared, it is possible to increase variations of the light emitting modes of the covers without the cover-side attachment portion.

In the above-described embodiment, the cover 50 of the second aspect is also of one type. However, if plural types of covers having the cover-side attachment portion 55 and different light emitting modes are prepared, it is possible to increase variations of the light emitting modes of the covers having the cover-side attachment portion 55.

In the above embodiment, the second cap 80 is not provided with a cap-side attachment portion like the cap-side attachment portion 75 of the first cap 70. However, the second cap 80 may also be provided with a cap-side attachment portion.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. A lighting unit comprising:
    a housing configured to house a light source and a circuit body constituting a circuit between the light source and an outside of the housing;
    a first cover mountable to the housing and configured to emit light from the light source to the outside of the housing;
    a second cover mountable to the housing and including a cover-side attachment portion attachable to an attachment hole of a lighting attachment member, the attachment hole comprising small diameter portions forming clamping portions and large diameter portions, the cover-side attachment portion attachable by inserting and locking to the small diameter portions of the attachment hole of the lighting attachment member, the second cover being configured to emit the light from the light source to the outside of the housing through the attachment hole; and
    a cap mountable to the second cover mounted to the housing, the cap including a light emitting surface configured to emit light, which is emitted from the light source and passes from the attachment hole, in a light emitting mode different from a light emitting mode of the light that passes through the attachment hole,
    wherein the first cover and the second cover are selectively mountable to the housing, and
    wherein the housing includes a cap lock projection to which the cap is mountable with the second cover mounted to the housing.

2. The lighting unit according to claim 1, wherein the housing comprises a housing-side attachment portion to be attached to the lighting attachment member.

3. The lighting unit according to claim 1, wherein
    the first cover comprises a first deformation restricting rib,
    the second cover comprises a second deformation restricting rib,
    the housing comprises a deformation restricting groove selectively receivable of the first deformation restricting rib and the second deformation restricting rib, and
    the cover-side attachment portion is attachable to the attachment hole of the lighting attachment member by rotation of the cover-side attachment portion.

4. The lighting unit according to claim 1, wherein
    the housing is formed of a member that does not transmit light,
    the first cover is formed of a member that transmits light, and
    the second cover includes: a plate portion formed of a member that does not transmit light; and a cylindrical portion provided in the plate portion and having an interior formed as an opening, the cylindrical portion configured to emit the light from the light source to the outside of the housing through the attachment hole.

5. The lighting unit according to claim 4, wherein the cap includes a cap-side attachment portion attachable to the attachment hole of the lighting attachment member.

6. The lighting unit according to claim 4, wherein the first cover is configured to emit the light from the light source through an entire area of the first cover.

7. The lighting unit according to claim 4, wherein the lighting attachment member comprises a vehicle body panel.

8. The lighting unit according to claim 4, further comprising an inner member formed of a member that transmits light and housed in between the housing and the second cover.

9. The lighting unit according to claim 4, wherein the inner member housed in between the housing and the second cover includes a circular portion higher by one step than a periphery of the circular portion at a position where the circular portion comes directly above the light source.

* * * * *